United States Patent
Munk-Nielsen

(10) Patent No.: US 11,228,257 B2
(45) Date of Patent: Jan. 18, 2022

(54) POWER CIRCUITS FOR MODULAR MULTI-LEVEL CONVERTERS (MMC) AND MODULAR MULTI-LEVEL CONVERTERS

(71) Applicant: AALBORG UNIVERSITET, Aalborg Øst (DK)

(72) Inventor: Stig Munk-Nielsen, Asaa (DK)

(73) Assignee: Aalborg Universitet

( * ) Notice: Subject to any disclaimer, the term of this patent is extended or adjusted under 35 U.S.C. 154(b) by 0 days.

(21) Appl. No.: 17/052,662

(22) PCT Filed: Apr. 10, 2019

(86) PCT No.: PCT/DK2019/050113
§ 371 (c)(1),
(2) Date: Nov. 3, 2020

(87) PCT Pub. No.: WO2019/210918
PCT Pub. Date: Nov. 7, 2019

(65) Prior Publication Data
US 2021/0242797 A1    Aug. 5, 2021

(30) Foreign Application Priority Data

May 4, 2018    (DK) .......................... PA 2018 70270

(51) Int. Cl.
*H02M 7/483*    (2007.01)
*H02M 3/335*    (2006.01)

(52) U.S. Cl.
CPC ..... *H02M 7/4835* (2021.05); *H02M 3/33584* (2013.01); *H02M 7/483* (2013.01)

(58) Field of Classification Search
CPC .. H02M 7/4835; H02M 7/483; H02M 7/5387; H02M 7/53871; H02M 3/3353; H02M 3/33569; H02M 3/33584; H02M 3/33576
See application file for complete search history.

(56) References Cited

U.S. PATENT DOCUMENTS

| | | | |
|---|---|---|---|
| 5,642,275 A | 6/1997 | Peng et al. | |
| 5,734,258 A * | 3/1998 | Esser | H02M 3/1582 323/224 |
| 5,907,479 A * | 5/1999 | Leu | H02M 3/3353 363/16 |
| 6,208,529 B1 * | 3/2001 | Davidson | H02M 3/33569 363/132 |

(Continued)

FOREIGN PATENT DOCUMENTS

| | | |
|---|---|---|
| CN | 102088252 A | 6/2011 |
| CN | 201994870 U | 9/2011 |

(Continued)

*Primary Examiner* — Yusef A Ahmed
(74) *Attorney, Agent, or Firm* — BakerHostetler

(57) ABSTRACT

Existing modular multi-level converters can be bulky because their submodule capacitors are comparatively large. To address this shortcoming in the state of the art, the present disclosure provides electronic power circuits and their use in power converters and in modular multi-level converters. The disclosed power circuits include connection terminals connected to electrically controllable bidirectional two-quadrant switches and to capacitors, as well as inductors that are magnetically coupled and operate to equalize voltages of the capacitors.

16 Claims, 20 Drawing Sheets

(56) References Cited

U.S. PATENT DOCUMENTS

| | | | | |
|---|---|---|---|---|
| 6,977,488 | B1* | 12/2005 | Nogawa | H02M 3/1582 323/222 |
| 7,154,250 | B2* | 12/2006 | Vinciarelli | H02M 3/1582 323/240 |
| 7,609,532 | B1* | 10/2009 | Schutten | H02M 7/53871 363/17 |
| 9,570,973 | B2* | 2/2017 | Chen | H02M 1/14 |
| 9,647,557 | B2* | 5/2017 | Milanesi | H02M 3/1584 |
| 9,935,562 | B2* | 4/2018 | Eren | H02M 1/126 |
| 10,381,951 | B1* | 8/2019 | Moradisizkoohi | H02M 7/4807 |
| 10,742,123 | B1* | 8/2020 | Sigamani | H02M 1/08 |
| 11,031,878 | B2* | 6/2021 | Jin | H02M 3/3376 |
| 11,038,374 | B2* | 6/2021 | Prabhala | H02J 50/12 |
| 11,063,518 | B1* | 7/2021 | Cook | H02M 3/33584 |
| 2004/0212357 | A1* | 10/2004 | Crocker | H02M 3/1582 323/282 |
| 2005/0088865 | A1* | 4/2005 | Lopez | H02M 7/5387 363/132 |
| 2008/0130326 | A1* | 6/2008 | Kuan | H02M 3/1588 363/21.14 |
| 2010/0226154 | A1* | 9/2010 | Leu | H02M 1/34 363/106 |
| 2011/0101951 | A1* | 5/2011 | Zhang | H02M 3/33592 323/305 |
| 2014/0063885 | A1* | 3/2014 | Itoh | H02M 7/4837 363/132 |
| 2014/0140114 | A1* | 5/2014 | Shoji | H02M 7/219 363/89 |
| 2014/0268888 | A1* | 9/2014 | Lv | H02M 1/088 363/10 |
| 2014/0301123 | A1* | 10/2014 | Lee | H02M 7/53871 363/132 |
| 2015/0207424 | A1* | 7/2015 | Okamoto | H02M 3/33569 363/17 |
| 2016/0365787 | A1 | 12/2016 | Geske et al. | |
| 2018/0062443 | A1* | 3/2018 | Cho | H02J 50/10 |
| 2018/0358823 | A1* | 12/2018 | Lemmen | H02J 7/342 |
| 2019/0146541 | A1* | 5/2019 | Cai | H02M 3/33584 327/540 |
| 2019/0173387 | A1* | 6/2019 | Tanaka | H02M 1/08 |
| 2019/0267895 | A1* | 8/2019 | Masuda | H02M 3/155 |
| 2020/0185931 | A1* | 6/2020 | Stuart | H02J 7/345 |
| 2020/0195123 | A1* | 6/2020 | Cai | H02M 3/337 |
| 2021/0006149 | A1* | 1/2021 | Zong | H02M 7/483 |
| 2021/0211059 | A1* | 7/2021 | Jin | H02M 3/33576 |
| 2021/0218347 | A1* | 7/2021 | Leu | H02M 7/53871 |
| 2021/0257919 | A1* | 8/2021 | Hayashi | H02M 3/285 |

FOREIGN PATENT DOCUMENTS

| | | |
|---|---|---|
| CN | 103475256 A | 12/2013 |
| WO | 2017044960 A1 | 3/2017 |

* cited by examiner

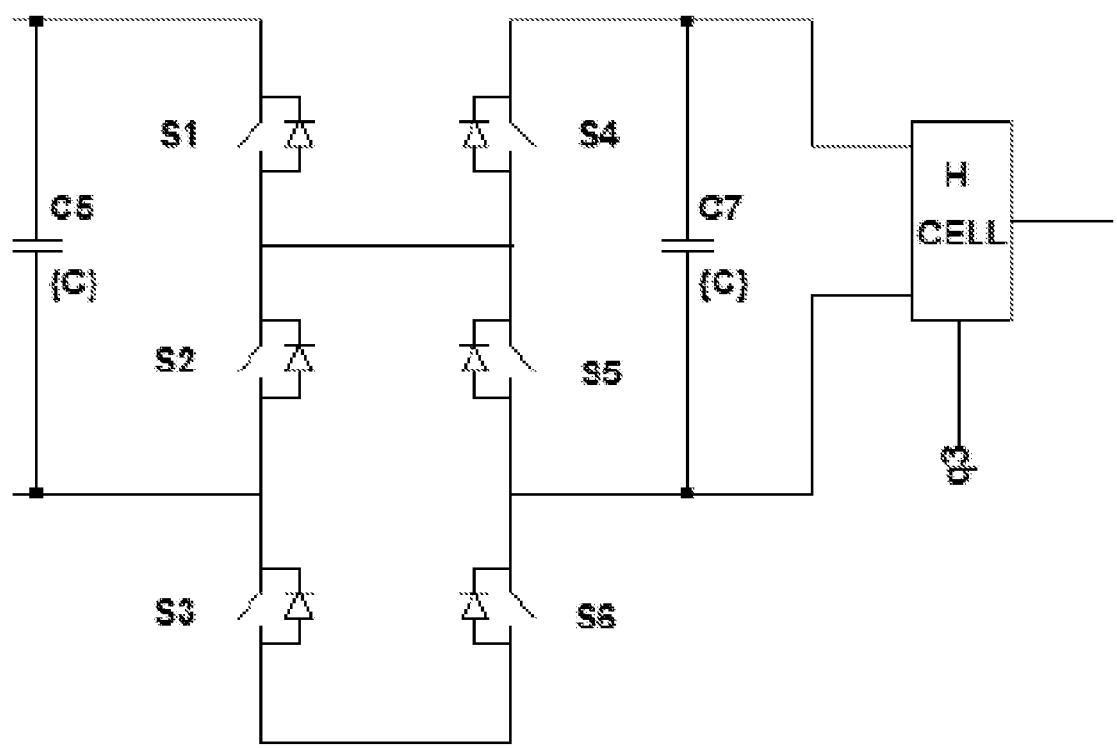
Figure 20
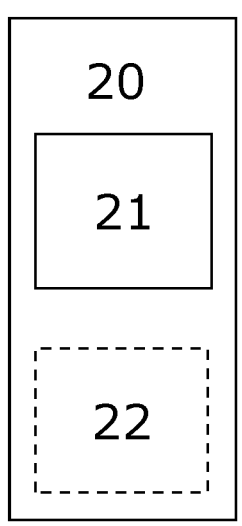
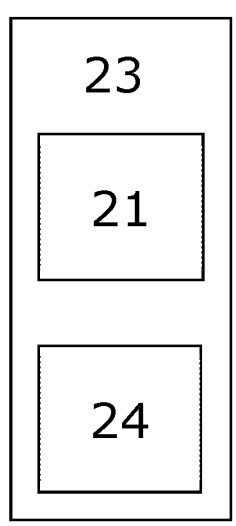
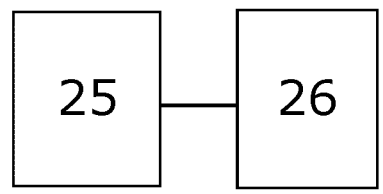
Figure 21            Figure 22            Figure 23

POWER CIRCUITS FOR MODULAR MULTI-LEVEL CONVERTERS (MMC) AND MODULAR MULTI-LEVEL CONVERTERS

CROSS-REFERENCE TO RELATED APPLICATIONS

This application is the National Stage of International Patent Application No. PCT/DK2019/050113 "Power Circuits for Modular Multi-Level Converters (MMC) and Modular Multi-Level Converters", filed Apr. 10, 2019, which claims priority to Danish Patent Application No. PA 2018 70270, filed May 4, 2018. The foregoing applications are incorporated herein by reference in their entireties for any and all purposes.

FIELD OF THE INVENTION

The present invention relates to electronic power circuits and their use in power converters and in modular multi-level converters (MMCs) comprising such power converters.

BACKGROUND OF THE INVENTION

Modular multi-level converters (MMCs) are a type of voltage-source converters, which may be used to convert one kind of voltage-source to another kind of voltage-source, such as e.g. converting a DC source to an AC source or AC to AC with a different voltage.

MMCs comprise a number of independent converter submodules, referred to herein as power converter circuits, each comprising a number of power circuits and each acting as an independent multi-level converter generating a voltage. With a suitable number of submodules connected in series, the power converter can create a stepped voltage waveform which can approximate very closely to a sine-wave and contains very low levels of harmonic distortion.

Advantages of MMCs include scalability, simple construction and low losses.

A disadvantage of current MMCs is that the submodule capacitors themselves are large and bulky.

Hence, an improved MMC with a high efficiency compared to existing solutions would be advantageous, and in particular a more efficient and/or less bulky MMC would be advantageous.

OBJECT OF THE INVENTION

It is an object of the present invention to provide power circuits suitable for use in power converter circuits. The topology of the power circuits allows for advanced control and operation of the power circuits and thereby any power converter circuit or power converter comprised of the power circuits in the present invention. The advanced control and operation of the power circuits advantageously allows for a reduction in the size of the capacitor in the power circuit when compared to prior art. This results from the charge of the capacitor having more degrees of freedom when compared to MMC power circuits in prior art. The advanced operation is particularly useful when clock operated switching ensures a better charge of the capacitor.

The power circuits advantageously behave as a DC/AC transformer converting DC voltage up to n-level times higher AC voltage. The circuit can replace a system of conventional power converter and conventional transformer, however without the galvanic isolation provided by the transformer.

It is another object of the present invention to provide power converter circuits for use in power converters. The power converter circuits are comprised of power circuits as disclosed herein and thus share the advantageous possibility of advanced control and operation of the power circuits.

It is another object of the present invention to provide a power converter, such as e.g. a modular multi-level converter (MMC), comprising power converter circuits as disclosed herein. The power converter is comprised of power converter circuits as disclosed herein and thus share the advantages listed for those.

It is another object of the present invention to provide a method for controlling a modular multi-level converter (MMC) as disclosed herein.

It is a further object of the present invention to provide an alternative to the prior art.

In particular, it may be seen as an object of the present invention to provide a modular multi-level converter comprising power converter circuits that solve the above mentioned problems of the submodule capacitors being large and bulky in the prior art.

SUMMARY OF THE INVENTION

Thus, the above described object and several other objects are intended to be obtained in a first aspect of the invention by providing a power circuit arranged to receive a DC electric input signal at a first and a second connection terminals, and to output an AC electric output signal at a third and a fourth connection terminals,
- the first connection terminal being connected to a first electrically controllable bidirectional two-quadrant switch,
- the second connection terminal being connected to a second electrically controllable bidirectional two-quadrant switch,
- the third connection terminal being connected to a third electrically controllable bidirectional two-quadrant switch,
- the fourth connection terminal being connected to a fourth electrically controllable bidirectional two-quadrant switch,
- the first, second, third and fourth switches being connected to a first node connected through a first node in such a way that the switches are connected between the first node and the respective first, second, third, and fourth connection terminals,
- a first capacitor being connected between the first and second connection terminals,
- a second capacitor being connected between the third and fourth connection terminals,
and wherein one of the first and second connection terminals may be connected to one of the third and fourth connection terminals through at least one electrically controllable bidirectional switch.

Here and in the following "connected" means electrically connected.

By "output an AC electric output signal" is meant that the power circuit outputs a stepped voltage waveform which can approximate an AC signal.

In an embodiment of the invention the first connection terminal may be connected to the third connection terminal through an electrically controllable bidirectional switch.

In another embodiment of the invention the switch connecting the first and third connection terminals may comprise a series connection of two electrically controllable switches.

In an embodiment of the invention the second connection terminal may be connected to the fourth connection terminal through an electrically controllable bidirectional switch.

In another embodiment of the invention the switch connecting the second and fourth connection terminals may comprise a series connection of two electrically controllable switches.

In an embodiment the electrically controllable switches may comprise IGBT, Bipolar and Schottky Diodes, MCT, GTO, SCR, HEMT or MOSFET transistors with diode function enabling bi-directional current flow.

In a further embodiment the power circuit may be implemented in a monolithic IC, in one single package configuration or comprised of discrete transistors with diode function.

The embodiments of the first aspect may be combined in ways that make sense. For example, the first connection terminal may be connected to the third connection terminal through an electrically controllable bidirectional switch and the second connection terminal may, in the same circuit, be connected to the fourth connection terminal through an electrically controllable bidirectional switch.

To obtain a power circuit for use in a power converter, it would also be possible to connect a first inductor between the first connection terminal and the third connection terminal and a second inductor between the second connection terminal and the fourth connection terminal and having the first and second inductor be magnetically coupled. This magnetic coupling will, however, also include a magnetization inductance, which will affect the circuit with a current. The magnetization current can be reduced by impedance, which will be frequency dependent. Thus, such a design must ensure a sufficient value of magnetization impedance to reduce the magnetization current to an acceptable level. The magnetically coupled inductors constitute a common mode transformer and for a common mode transformer the weight is large due to the dependency on the load frequency. Further, if the frequency decreases, the weight goes up. Thus, a magnetically coupled power circuit as described above will, while using a very low number of components, be too heavy for the use intended in the present invention.

The second aspect of the invention provides power circuits comprising magnetically coupled inductors, which overcome the weight problem described above by introducing an electronic commutator. The purpose of the commutator is to control the frequency seen by the coupled inductors, in this way making the circuit independent of the AC load frequency, making the circuit able to generate voltages from DC (0 Hz) and making the size of the magnetics dependent on the commutator frequency.

In a second aspect is provided a power circuit arranged to receive a DC electric input signal at first and second connection terminals, and to output an AC electric output signal at a third and a fourth connection terminals,
  the first connection terminal being connected to a first electrically controllable bidirectional two-quadrant switch,
  the second connection terminal being connected to a second electrically controllable bidirectional two-quadrant switch,
  the third connection terminal being connected to a third electrically controllable bidirectional two-quadrant switch,
  the fourth connection terminal being connected to a fourth electrically controllable bidirectional two-quadrant switch,
  the first switch, the second switch, the third switch and the fourth switch being connected to a first node in such a way that the switches are connected between the first node and the respective first, second, third, and fourth connection terminals,
a first electronic component being connected to the first connection terminal,
a second electronic component being connected to the second connection terminal,
a third electronic component being connected to a second node,
the second node, the first and third electronic component and the first connection terminal being connected,
a fourth electronic component being connected to a third node,
the third node, the second and fourth electronic component and the second connection terminal being connected,
a first capacitor being connected to the second and third node,
the first, second, third and fourth electronic components being connected to a first coupled inductor in such a way that:
  the first electronic component is connected between the first coupled inductor and the first connection terminal,
  the second electronic component is connected between the first coupled inductor and the second connection terminal,
  the third electronic component is connected between the first coupled inductor and the second node, and
  the fourth electronic component is connected between the first coupled inductor and the third node, wherein further:
a fifth electronic component is connected to the third connection terminal,
a sixth electronic component is connected to the fourth connection terminal,
a seventh electronic component is connected to a fourth node,
the fourth node, the fifth and seventh electronic component and the third connection terminal being connected,
an eighth electronic component is connected to a fifth node,
the fifth node, the sixth and eighth electronic component and the fourth connection terminal being connected,
a second capacitor is connected to the fourth and fifth node,
the fifth, sixth, seventh and eighth electronic components, are connected to a second coupled inductor in such a way that:
  the fifth electronic component is connected between the second coupled inductor and the third connection terminal,
  the sixth electronic component is connected between the second coupled inductor and the fourth connection terminal,
  the seventh electronic component is connected between the second coupled inductor and the fourth node, and
  the eighth electronic component is connected between the second coupled inductor and the fifth node, and wherein the first, second, third, fourth, fifth, sixth, seventh and eighth electronic components are selected from the group consisting of an electrically controllable switch, a capacitor and a diode.

In a first embodiment of the second aspect of the invention the first, second, third, fourth, fifth, sixth, seventh and eighth electronic components may be electrically controllable switches.

In a second embodiment of the second aspect of the invention the first, second, seventh and eighth electronic components may be electrically controllable switches and the third, fourth, fifth and sixth electronic components may be capacitors.

In a third embodiment of the second aspect of the invention the first, second, third and fourth electronic components may be electrically controllable switches and the fifth, sixth, seventh and eighth electronic components may be diodes.

In a fourth embodiment of the second aspect of the invention the first and second electronic components may be capacitors, the third and fourth electronic components may be electrically controllable switches and the fifth, sixth, seventh and eighth electronic components may be diodes.

In an embodiment, which may be combined with any of the first, second, third and fourth embodiments of the second aspect, the electrically controllable switches may comprise IGBT, MCT, GTO, SCR, HEMT or MOSFET transistors with diode function enabling bi-directional current flow.

In a further embodiment, which may be combined with any of the first, second, third and fourth embodiments of the second aspect, the power circuit may be implemented in one single package configuration or comprised of discrete transistors with diode function.

The power circuits presented in the first and second aspect are all 3-level circuits, which means that 3 voltage levels can be output by each circuit. In a third aspect is provided power circuits, which can output 2 voltage levels, i.e. 2-level circuits.

In a third aspect is provided a power circuit arranged to receive a DC electric input signal at first and second connection terminals, and to output an AC or DC electric output signal at a third and a fourth connection terminals,
  the first connection terminal being connected to a first electrically controllable bidirectional two-quadrant switch,
  the second connection terminal being connected to a second electrically controllable bidirectional two-quadrant switch,
  the third connection terminal being connected to a first electronic component,
  the fourth connection terminal being connected to a second electronic component,
  the first switch and the second switch being connected to a first node in such a way that the switches are connected between the first node and the respective first and second connection terminals,
  a third electronic component being connected to the first connection terminal,
  a fourth electronic component being connected to the second connection terminal,
  a third electrically controllable bidirectional two-quadrant switch being connected to a second node,
  the second node, the third electronic component, the third electrically controllable bidirectional two-quadrant switch and the first connection terminal being connected,
  a fourth electrically controllable bidirectional two-quadrant switch being connected to a third node,
  the third node, the fourth electronic component, the fourth electrically controllable bidirectional two-quadrant switch and the second connection terminal being connected,
  a first capacitor being connected to the second and third node,
  the third electronic component, the fourth electronic component, the third electrically controllable bidirectional two-quadrant switch and the fourth electrically controllable bidirectional two-quadrant switch being connected to a first coupled inductor in such a way that:
    the third electronic component is connected between the first coupled inductor and the first connection terminal,
    the fourth electronic component is connected between the first coupled inductor and the second connection terminal,
    the third electrically controllable bidirectional two-quadrant switch is connected between the first coupled inductor and the second node, and
    the fourth electrically controllable bidirectional two-quadrant switch is connected between the first coupled inductor and the third node, wherein further:
  a fifth electronic component is connected to a fourth node,
  the fourth node, the first and fifth electronic component and the third connection terminal being connected,
  a sixth electronic component is connected to a fifth node,
  the fifth node, the second and sixth electronic component and the fourth connection terminal being connected,
  a second capacitor is connected to the fourth and fifth node,
  the first, second, fifth and sixth electronic component are connected to a second coupled inductor in such a way that:
    the first electronic component is connected between the second coupled inductor and the third connection terminal,
    the second electronic component is connected between the second coupled inductor and the fourth connection terminal,
    the fifth electronic component is connected between the second coupled inductor and the fourth node, and
    the sixth electronic component is connected between the second coupled inductor and the fifth node, and
  wherein:
    the first, second, fifth and sixth electronic component are diodes, or
    the first and second electronic component are diodes and the fifth and sixth electronic components are capacitors, or
    the first and second electronic component are capacitors and the fifth and sixth electronic components are diodes,
  and wherein further:
    the third and fourth electronic components are electrically controllable switches and the first node is connected to the fourth connection terminal, or
    the third and fourth electronic components are capacitors and the first node is connected to the fourth connection terminal, or
    the first and second electronic components are capacitors and the first node is connected to the third connection terminal.

An example of a use for the 2-level circuits provided in the third aspect is flue gas cleaning systems installed in chimneys at power plants, where the system at its core has a DC voltage of approximately 100,000 V. For a DC system 3-level circuits has more functionality (more switches) than needed and so to produce the high DC voltage, 2-level circuits are used.

2-level power circuits can be used to make an AC voltage, but there will always be a DC voltage present. Mostly this DC voltage will not result in a flow of current and is therefore sometimes ignored. However, the DC voltage is there and electrical motors coupled to a 2-level power converter will have electrically insulated windings to prevent a current from running due to the DC voltage. Most electrical drives, by far, are 2-level even when considering drives ranging in power from e.g. MW wind turbines to washing machines (W).

2-level power circuits are widely used partly due to reduced cost when compared with 3-level power circuits. To make an AC voltage with an amplitude of e.g. 325 V requires that the switches in a 2-level power converter can tolerate twice the voltage, i.e. 650 V, as the 2-level power converter only has to voltage levels, in this case 0 V and 650 V. A 3-level power circuit for producing an AC voltage of 325 V will have three voltage levels: −325 V, 0 V and 325 V. However, the higher tolerance required of the switches does not result in a significantly higher cost, so when an AC voltage of 325 V (rms=230 V) is needed, a 2-level power converter is almost always chosen.

In the rarer cases, where the higher tolerance switches cannot be used or the voltage is so high that no switch can handle it, it is necessary to couple either switches or circuits in series. This will be the case for the flue gas cleaning systems mentioned in which 100,000 V DC voltage is needed.

In an embodiment the electrically controllable switches may comprise IGBT, MCT, GTO, SCR, HEMT or MOSFET transistors with diode function enabling bi-directional current flow.

In a further embodiment the power circuit may be implemented in one single package configuration or comprised of discrete transistors with diode function.

The power circuits provided in the first, second and third aspect of the invention may be used in combination with each other.

In a fourth aspect is provided a power converter circuit comprising a power circuit according to the first, second or third aspect or a power converter circuit comprising two or more power circuits according to the first, second or third aspect, wherein the two or more power circuits are connected in parallel.

The parallel coupling of the power circuits makes it easy to scale the power converter circuit as needed.

In a fifth aspect is provided a power converter comprising two or more power converter circuits according to the fourth aspect, wherein the two or more power converter circuits are connected in series. E.g. a plurality of power converter circuits each designed for a maximum voltage handling of such as first voltage, such as 100-1000V, can be series connected to provide a maximum voltage handling of such as 1000V-100 kV, such as 33 kV.

In power converter embodiments, the use of two energy storage elements, e.g. two capacitors, can be connected by inductors, e.g. two inductors. Specifically, the inductors may be magnetically coupled. Specifically, pulse voltages may be used. Specifically, the switches involved may be soft-switched.

The power converter may be used to step up voltage or step down voltage at large voltage ratios with low power losses. In some systems this is done by a grid side power converter and transformer and in such systems a power converter as provided in the fifth aspect may eliminate the need for the heavy and bulky transformer. The power circuits provided by the first, second and third aspect of the present invention may be thought of as a "variable gearbox" when compared to a transformer. In such an analogy the transformer is a gearbox with one gear. The power converter may also conceivably replace other transformers.

An advantage of the power converter of the present invention is a reduction in the number of power electronics components needed.

In an embodiment the power converter circuits may be configured such that each power converter circuit experiences approximately the same power, when the power converter is in use.

In a further embodiment the power converter circuits may be connected in series with a half bridge circuit.

A half bridge circuit, also called a half-H bridge, is a well-known type of circuit.

In another embodiment the power converter may be arranged to receive a DC input voltage of 1 V-1.5 kV, such as 1000 V.

In an embodiment the power converter may be arranged to output an AC voltage of 100 V-100 kV, such as 690 V or 33 kV or 66 kV.

In a further embodiment the power converter may be arranged to convert electric power of 1-100 W, 100 W-1 kW, 1 kW-100 kW, 100 kW-1 MW, 1 MW-10 MW or above 10 MW.

In a sixth aspect is provided a device comprising a power converter according to the fifth aspect, such as a device further comprising a DC power electric generator.

In a seventh aspect is provided a modular multi-level converter (MMC) comprising a power converter according to the fifth aspect and further comprising a control circuit to control the switches.

In an embodiment the MMC may operate at a fundamental frequency within the range from 1 Hz to 20 MHz.

In an eighth aspect is provided a method for controlling a modular multi-level converter (MMC) according to the seventh aspect, the method comprising:
  providing an MMC as disclosed herein;
  controlling the electrically controllable switches such that output voltage states generate an alternating voltage causing a current of controllable amplitude and frequency controlling the load connected to the MMC.

By "MMC as disclosed herein" is meant a modular multi-level converter (MMC) obtainable from the disclosure herein, i.e. an MMC comprising power converter circuits as disclosed herein and where the power converter circuits comprise power circuits as also disclosed herein.

The first, second and third aspect of the present invention may each be combined with each other by connecting power circuits to each other as long as the connections makes sense. These and other aspects of the invention will be apparent from and elucidated with reference to the embodiments described hereinafter.

BRIEF DESCRIPTION OF THE FIGURES

The present invention and in particular preferred embodiments thereof will now be disclosed in more detail with regard to the accompanying figures. The FIGS. show ways of implementing the present invention and are not to be construed as being limiting to other possible embodiments falling within the scope of the attached claim set.

FIG. 20 illustrates schematically a power converter circuit connected in series with a half bridge circuit as an illustration of claim 18.

FIG. 21 illustrates schematically a device comprising a power converter.

FIG. 22 illustrates schematically a modular multi-level converter (MMC) comprising a power converter and further comprising a control circuit to control the switches.

FIG. 23 is an illustration of claim 25.

DETAILED DESCRIPTION OF AN EMBODIMENT

Figure 1:
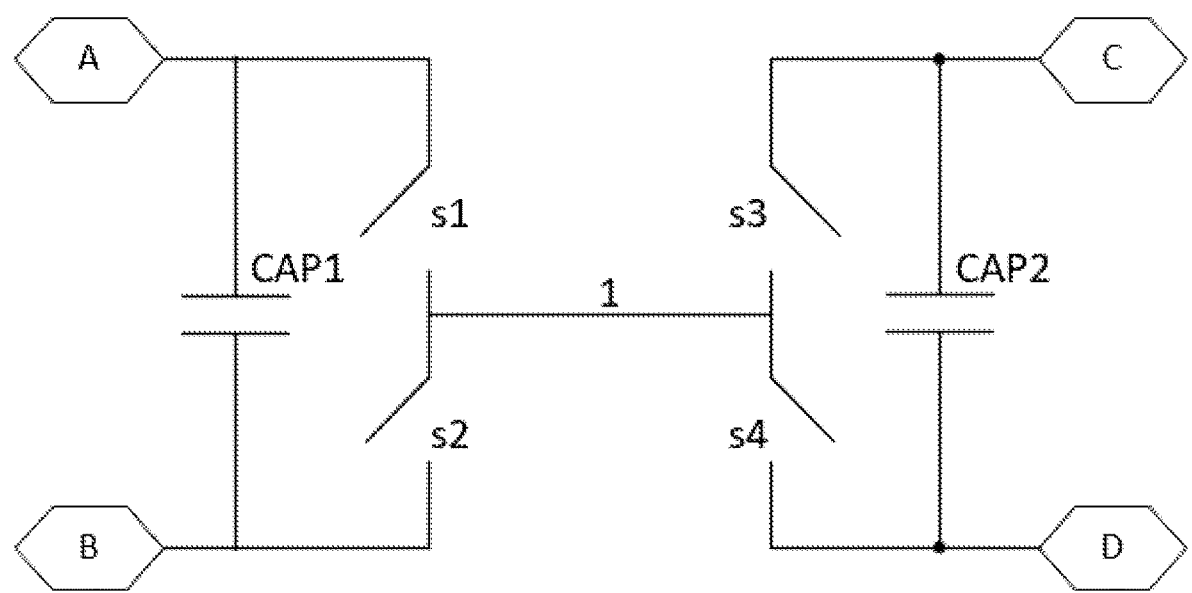
FIG. 1 illustrate schematically a power circuit.

FIG. 1 shows a basic power circuit. The power circuit is arranged to receive a DC electric input signal at a first and a second connection terminals A, B and to output an AC electric output signal at a third and a fourth connection terminals C, D.

The first connection terminal A is connected to a first electrically controllable bidirectional two-quadrant switch s1, the second connection terminal B is connected to a second electrically controllable bidirectional two-quadrant switch s2, the third connection terminal C is connected to a third electrically controllable bidirectional two-quadrant switch s3, and the fourth connection terminal D is connected to a fourth electrically controllable bidirectional two-quadrant switch s4.

Additionally, the first, second, third and fourth switches s1, s2, s3, s4 are connected to a first node 1 connected through a first node 1 in such a way that the switches s1, s2, s3, s4 are connected between the first node 1 and the respective first, second, third, and fourth connection terminals A, B, C, D.

Further, a first capacitor CAP1 is connected between the first and second connection terminals A, B, while a second capacitor CAP2 is connected between the third and fourth connection terminals C, D.

As electrically controllable switches one may use IGBT or MOSFET transistors with diode function enabling bi-directional current flow.

FIGS. 2-7 show power circuits according to embodiments of the first aspect of the present invention, wherein the circuits have the same connections as the circuit shown in FIG. 1 and where, additionally, one of the first and second connection terminals A, B is connected to one of the third and fourth connection terminals C, D through at least one electrically controllable bidirectional switch sa, sb, s5, s6, s7, s8. As electrically controllable switches one may use IGBT or MOSFET transistors with diode function enabling bi-directional current flow.

Figure 2:
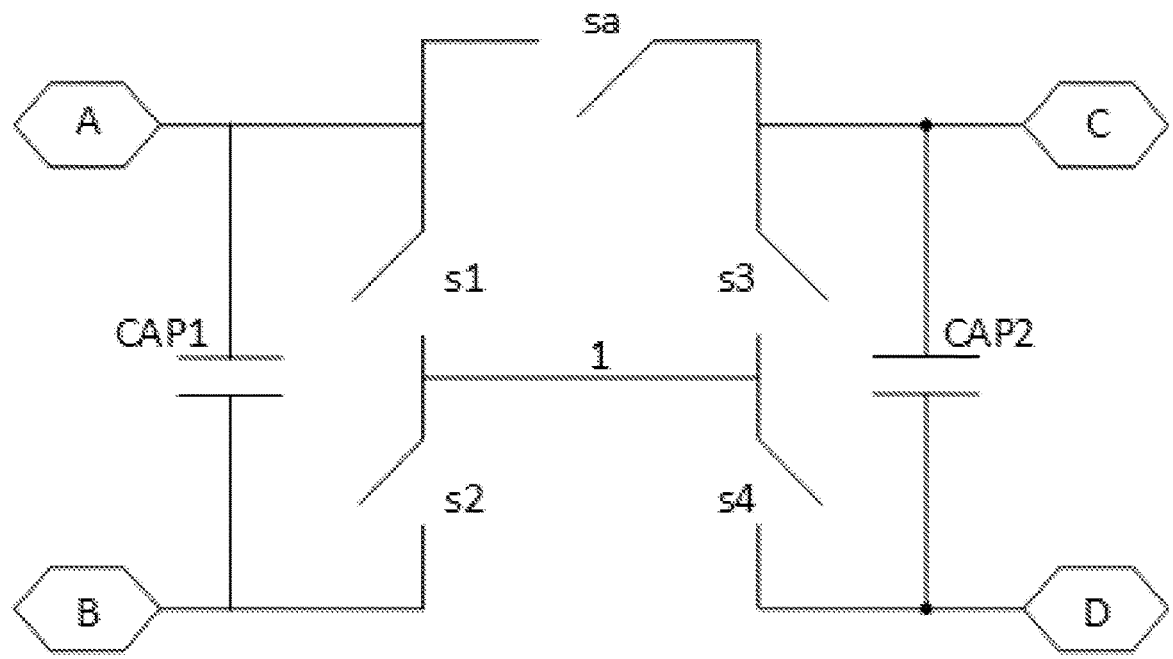
FIGS. 2-7 illustrate schematically a power circuit as provided in the first aspect.

FIG. 2 shows a power circuit according to an embodiment of the present invention, wherein the circuit has the same components and connections as the circuit shown in FIG. 1 and where, additionally, the first connection terminal A is connected to the third connection terminal C through an electrically controllable bidirectional switch sa. As electrically controllable switches one may use IGBT or MOSFET transistors with diode function enabling bi-directional current flow.

Figure 3:
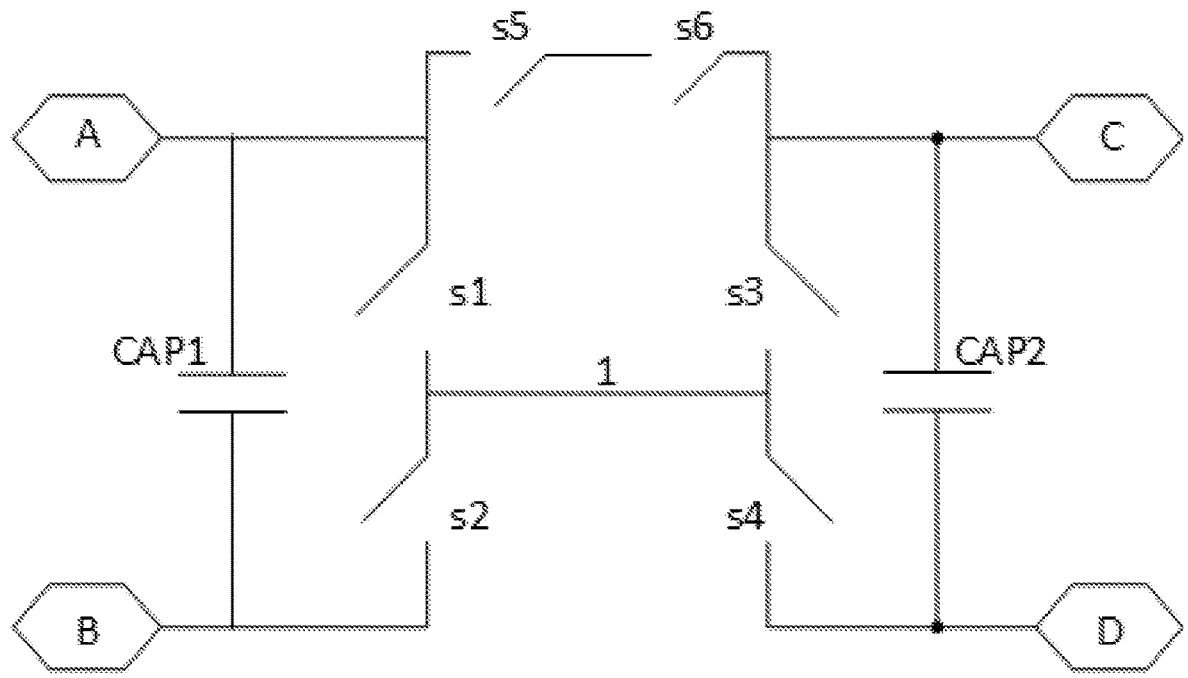

FIG. 3 shows a power circuit according to an embodiment of the present invention, wherein the circuit has the same components and connections as the circuit shown in FIG. 2 and where, additionally, the switch sa connecting the first and third connection terminals A, C comprises a series connection of two electrically controllable switches s5, s6. As electrically controllable switches one may use IGBT or MOSFET transistors with diode function enabling bi-directional current flow.

Figure 4:
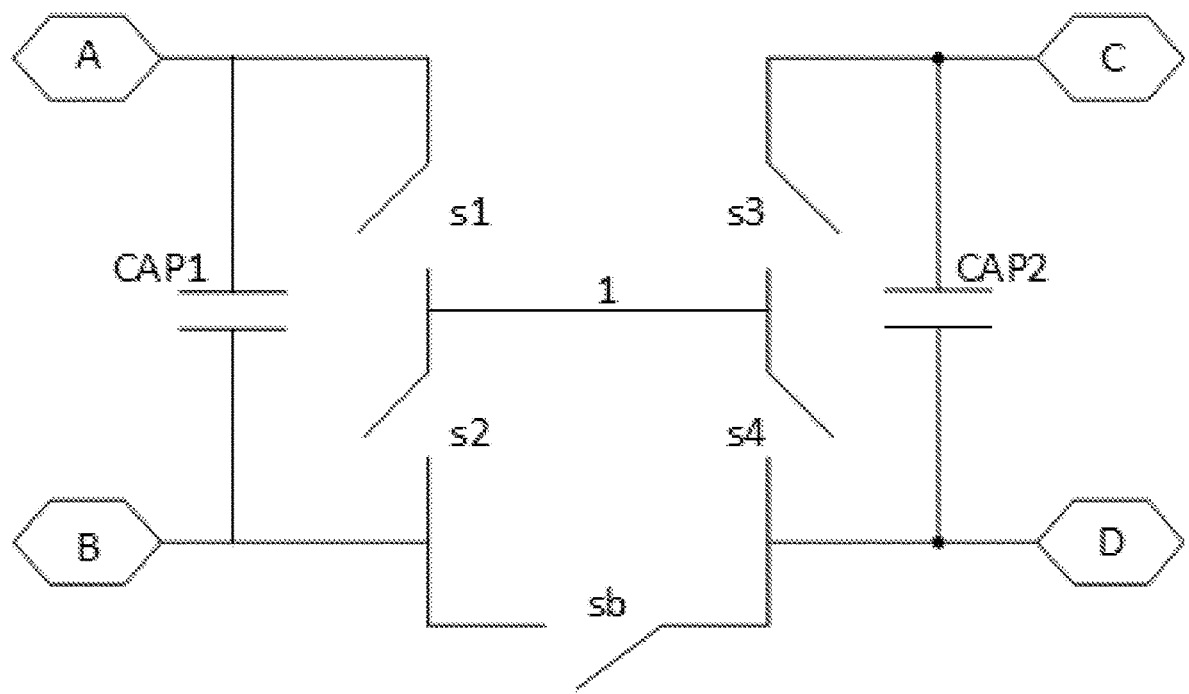

FIG. 4 shows a power circuit according to an embodiment of the present invention, wherein the circuit has the same components and connections as the circuit shown in FIG. 1 and where, additionally, the second connection terminal B is connected to the fourth connection terminal D through an electrically controllable bidirectional switch sb. As electrically controllable switches one may use IGBT or MOSFET transistors with diode function enabling bi-directional current flow.

Figure 5:
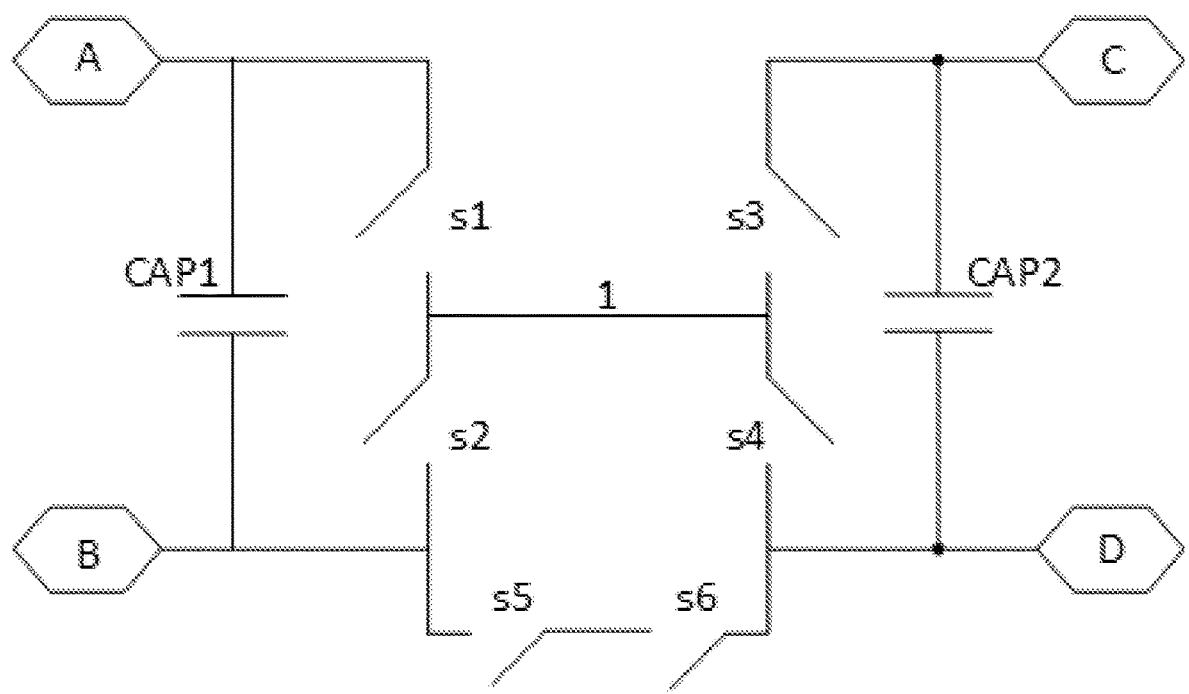

FIG. 5 shows a power circuit according to an embodiment of the present invention, wherein the circuit has the same components and connections as the circuit shown in FIG. 3 and where, additionally, the switch sb connecting the second and fourth connection terminals B, D comprises a series connection of two electrically controllable switches s7, s8. As electrically controllable switches one may use IGBT or MOSFET transistors with diode function enabling bi-directional current flow.

Figure 6:
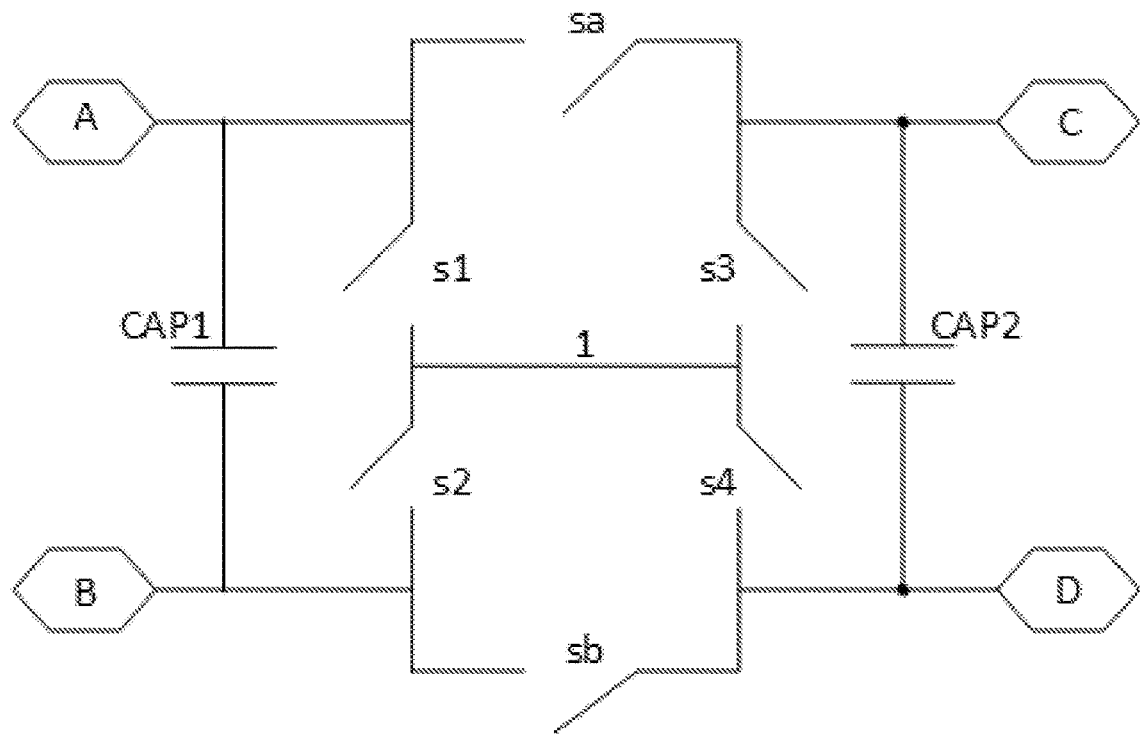

FIG. 6 shows a power circuit according to an embodiment of the present invention, wherein the circuit has the same components and connections as the circuit shown in FIG. 1 and where, additionally, the first connection terminal A is connected to the third connection terminal C through an electrically controllable bidirectional switch sa and the second connection terminal B is connected to the fourth connection terminal D through an electrically controllable bidirectional switch sb. As electrically controllable switches one may use IGBT or MOSFET transistors with diode function enabling bi-directional current flow.

Figure 7:
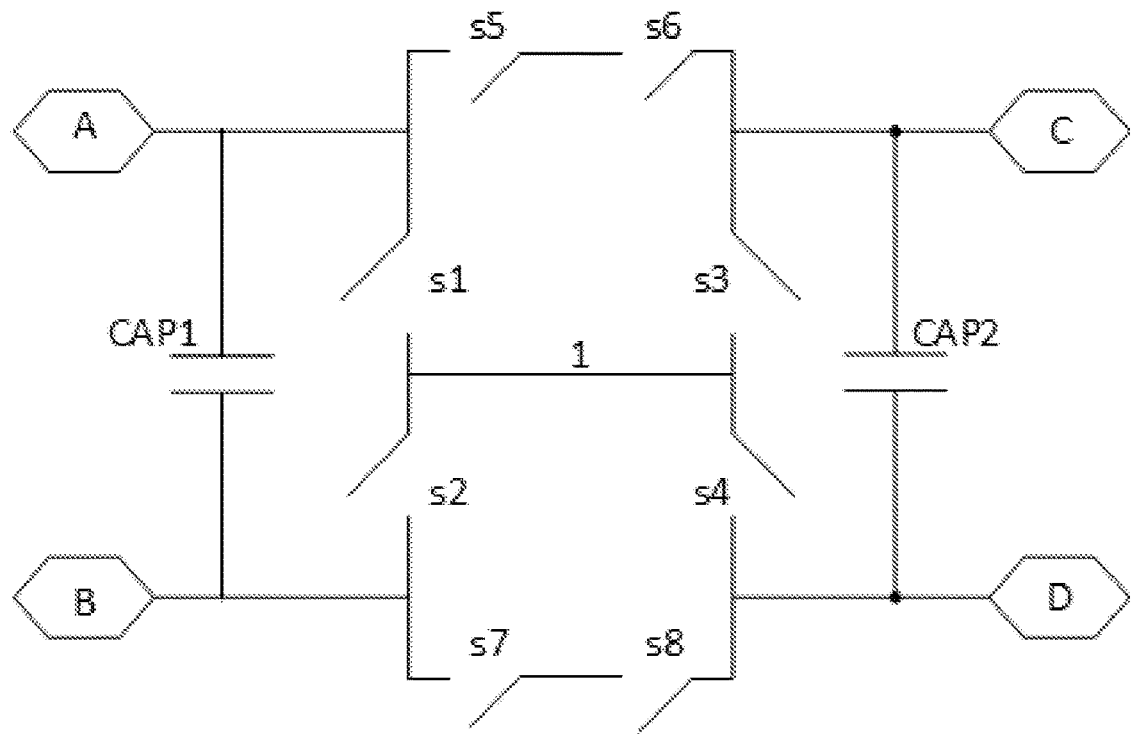

FIG. 7 shows a power circuit according to an embodiment of the present invention, wherein the circuit has the same components and connections as the circuit shown in FIG. 6 and where, additionally, the switch sa connecting the first and third connection terminals A, C comprises a series connection of two electrically controllable switches s5, s6 and the switch sb connecting the second and fourth connection terminals B, D comprises a series connection of two electrically controllable switches s7, s8. As electrically controllable switches one may use IGBT or MOSFET transistors with diode function enabling bi-directional current flow.

Figure 8:
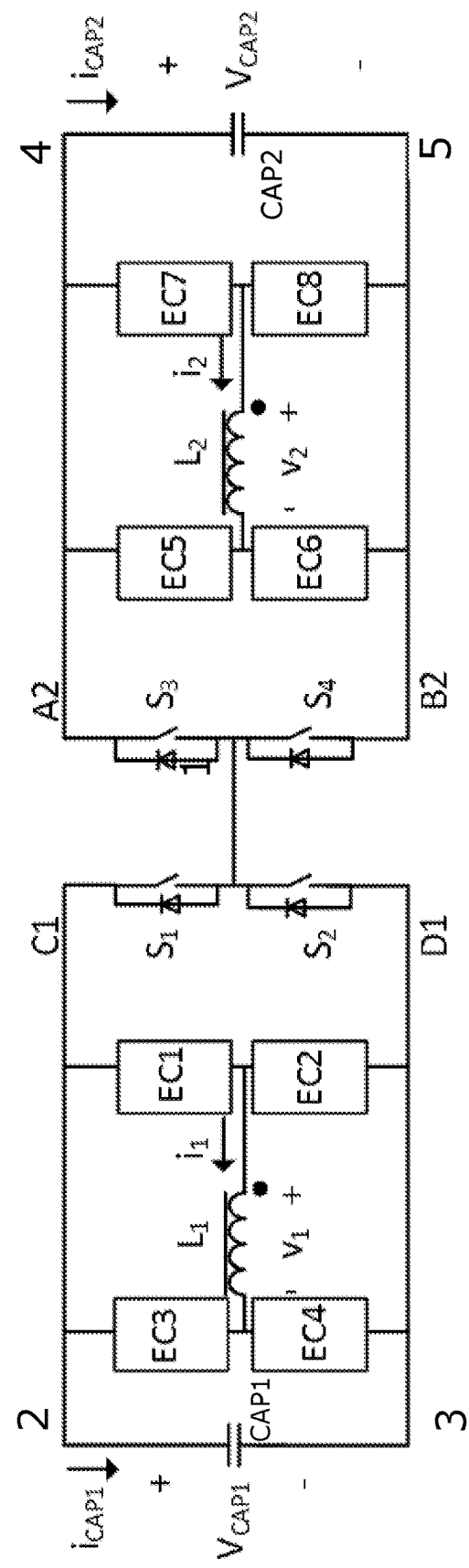
FIGS. 8-12 illustrate schematically a power circuit as provided in the second aspect.

FIG. 8 shows a power circuit, which forms the basis for the power circuits according to the second aspect of the present invention. The power circuit is arranged to receive a DC electric input signal at the first and second connection terminals C1, D1, and to output an AC electric output signal at a third and a fourth connection terminals A2, B2.

The first connection terminal C1 is connected to a first electrically controllable bidirectional two-quadrant switch $S_1$, the second connection terminal D1 is connected to a second electrically controllable bidirectional two-quadrant switch $S_2$, the third connection terminal A2 is connected to a third electrically controllable bidirectional two-quadrant switch $S_3$, and the fourth connection terminal B2 is connected to a fourth electrically controllable bidirectional two-quadrant switch $S_4$.

The first switch $S_1$, the second switch $S_2$, the third switch $S_3$ and the fourth switch $S_4$ are connected to a first node 1 in such a way that the switches s1, s2, s3, s4 are connected between the first node 1 and the respective first, second, third, and fourth connection terminals C1, D1, A2, B2.

A first electronic component EC1 is connected to the first connection terminal C1 and a second electronic component EC2 is connected to the second connection terminal D1.

A third electronic component EC3 is connected to a second node 2, and the second node 2, the first and third electronic component EC1, EC3 and the first connection terminal C1 are connected.

A fourth electronic component EC4 is connected to a third node 3, and the third node 3, the second and fourth electronic component EC2, EC4 and the second connection terminal D1 are connected.

A first capacitor CAP1 is connected to the second and third node 2, 3.

The first, second, third and fourth electronic components EC1, EC2, EC3, EC4 are connected to a first coupled inductor L1 in such a way that:

the first electronic component EC1 is connected between the first coupled inductor L1 and the first connection terminal C1, the second electronic component EC2 is connected between the first coupled inductor L1 and the second connection terminal D1, the third electronic component EC3 is connected between the first coupled inductor L1 and the second node 2, and the fourth electronic component EC4 is connected between the first coupled inductor L1 and the third node 3.

A fifth electronic component EC5 is connected to the third connection terminal A2 and a sixth electronic component EC6 is connected to the fourth connection terminal B2.

A seventh electronic component EC7 is connected to a fourth node 4, and the fourth node 4, the fifth and seventh electronic component EC5, EC7 and the third connection terminal A2 are connected.

An eighth electronic component EC8 is connected to a fifth node 5, and the fifth node 5, the sixth and eighth electronic component EC6, EC8 and the fourth connection terminal B2 are connected.

A second capacitor CAP2 is connected to the fourth and fifth node 4, 5.

The fifth, sixth, seventh and eighth electronic components EC5, EC6, EC7, EC8, are connected to a second coupled inductor L2 in such a way that:

the fifth electronic component EC5 is connected between the second coupled inductor L2 and the third connection terminal A2, the sixth electronic component EC6 is connected between the second coupled inductor L2 and the fourth connection terminal B2, the seventh electronic component EC7 is connected between the second coupled inductor L2 and the fourth node 4, and the eighth electronic component EC8 is connected between the second coupled inductor L2 and the fifth node 5.

Further, the first, second, third, fourth, fifth, sixth, seventh and eighth electronic components EC1, EC2, EC3, EC4, EC5, EC6, EC7, EC8 are selected from the group consisting of an electrically controllable switch, a capacitor and a diode.

As electrically controllable switches one may use IGBT or MOSFET transistors with diode function enabling bi-directional current flow.

Figure 9:
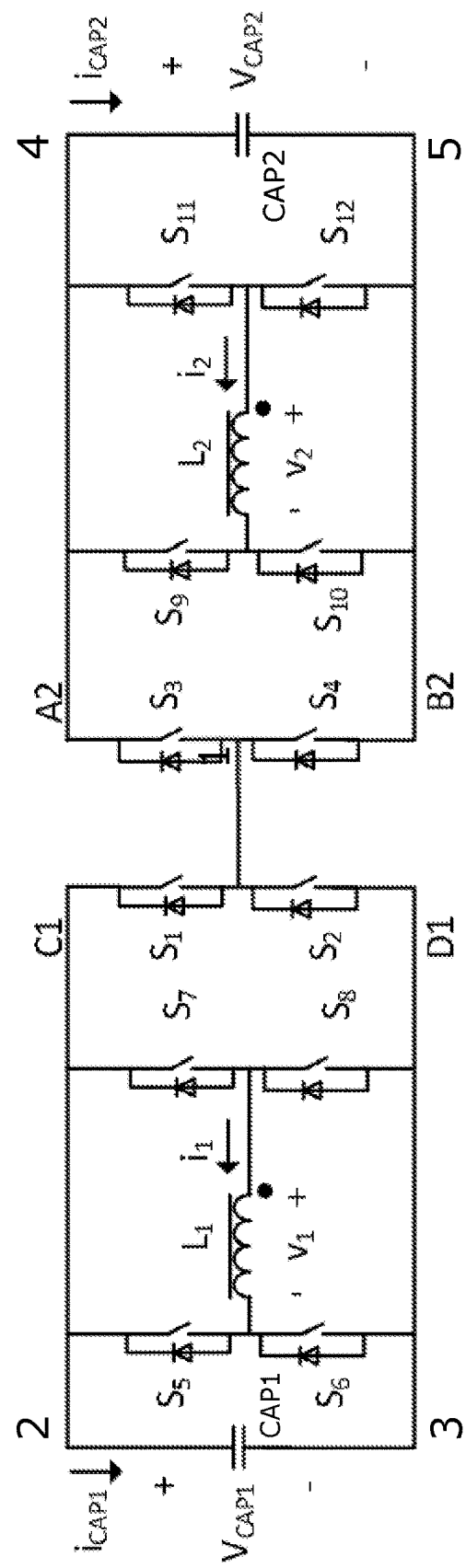

FIG. 9 shows a power circuit according to an embodiment of the second aspect of the present invention, wherein the circuit has the same components and connections as the circuit shown in FIG. 8 and wherein the first, second, third, fourth, fifth, sixth, seventh and eighth electronic components EC1, EC2, EC3, EC4, EC5, EC6, EC7, EC8 are electrically controllable switches $S_5, S_6, S_7, S_8, S_9, S_{10}, S_{11}, S_{12}$.

As electrically controllable switches one may use IGBT or MOSFET transistors with diode function enabling bi-directional current flow.

Figure 10:
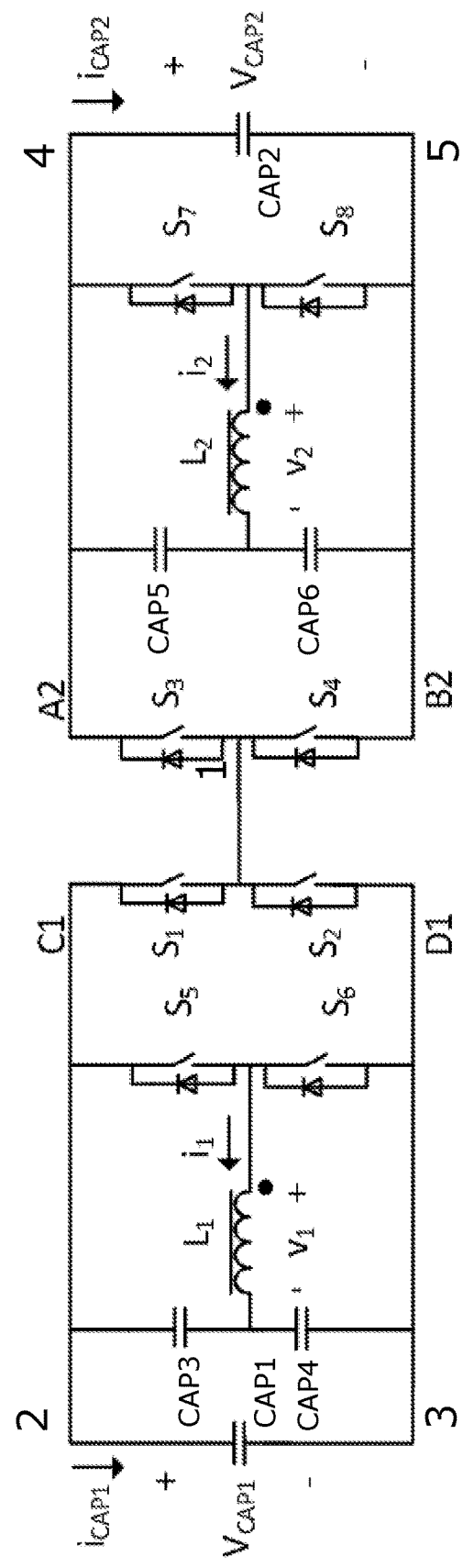

FIG. 10 shows a power circuit according to an embodiment of the second aspect of the present invention, wherein the circuit has the same components and connections as the circuit shown in FIG. 8 and wherein the first, second, seventh and eighth electronic components EC1, EC2, EC7, EC8 are electrically controllable switches $S_5, S_6, S_7, S_8$ and the third, fourth, fifth and sixth electronic components EC3, EC4, EC5, EC6 are capacitors, $CAP_3, CAP_4$.

As electrically controllable switches one may use IGBT or MOSFET transistors with diode function enabling bi-directional current flow.

Simulations on converters using the power circuits shown in FIGS. 9 and 10 show that the size of the magnetic coupled inductors are reduced as expected making this choice of power circuits sensible.

Figure 11:
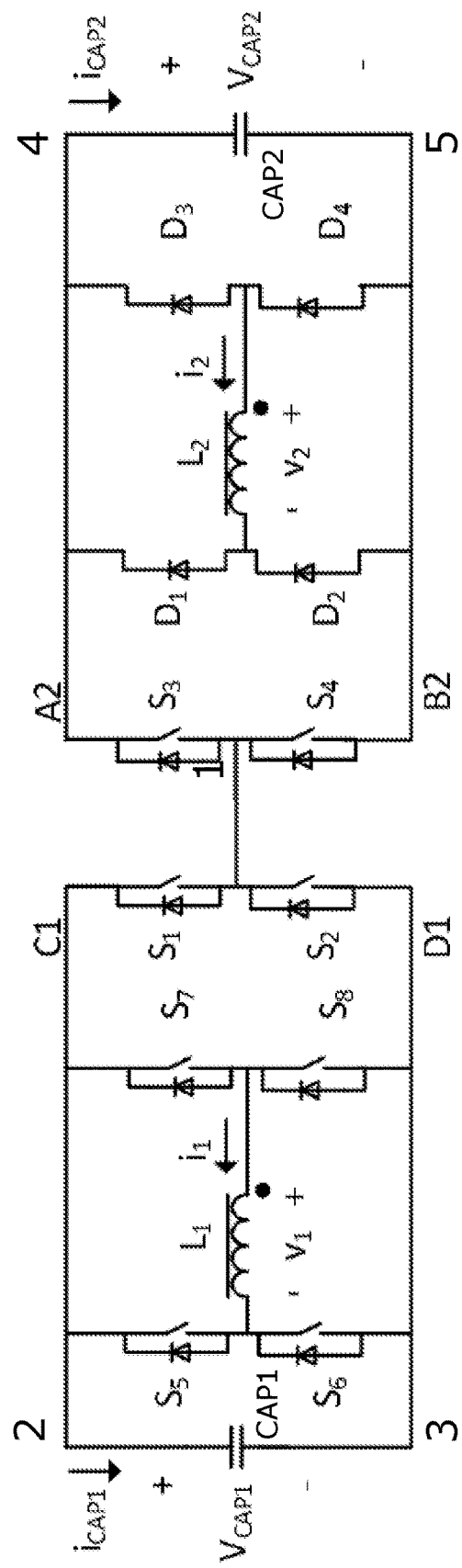

FIG. 11 shows a power circuit according to an embodiment of the second aspect of the present invention, wherein the circuit has the same components and connections as the circuit shown in FIG. 8 and wherein the first, second, third and fourth electronic components EC1, EC2, EC3, EC4 are electrically controllable switches $S_5, S_6, S_7, S_8$ and the fifth, sixth, seventh and eighth electronic components EC5, EC6, EC7, EC8 are diodes $D_1, D_2, D_3, D_4$.

As electrically controllable switches one may use IGBT, MCT, GTO, SCR, HEMT or MOSFET transistors with diode function enabling bi-directional current flow.

Figure 12:
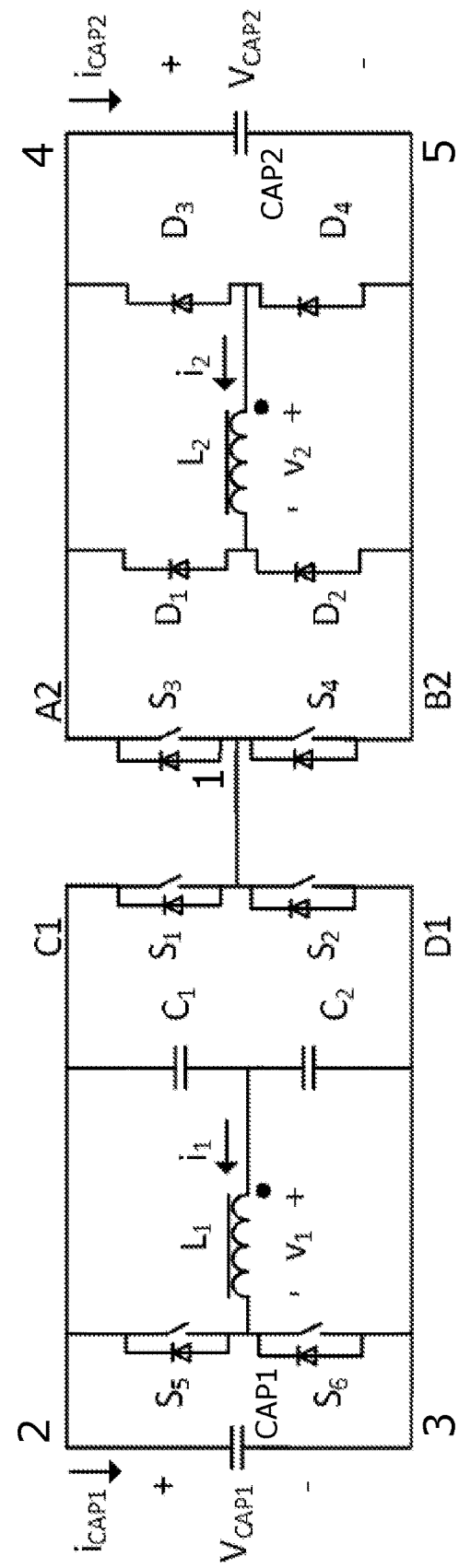

FIG. 12 shows a power circuit according to an embodiment of the second aspect of the present invention, wherein the circuit has the same components and connections as the circuit shown in FIG. 8 and wherein the first and second electronic components EC1, EC2 are capacitors $C_1, C_2$ the third and fourth electronic components EC3, EC4 are electrically controllable switches $S_5, S_6$ and the fifth, sixth, seventh and eighth electronic components EC5, EC6, EC7, EC8 are diodes $D_1, D_2, D_3, D_4$.

As electrically controllable switches one may use IGBT or MOSFET transistors with diode function enabling bi-directional current flow.

Figure 13:
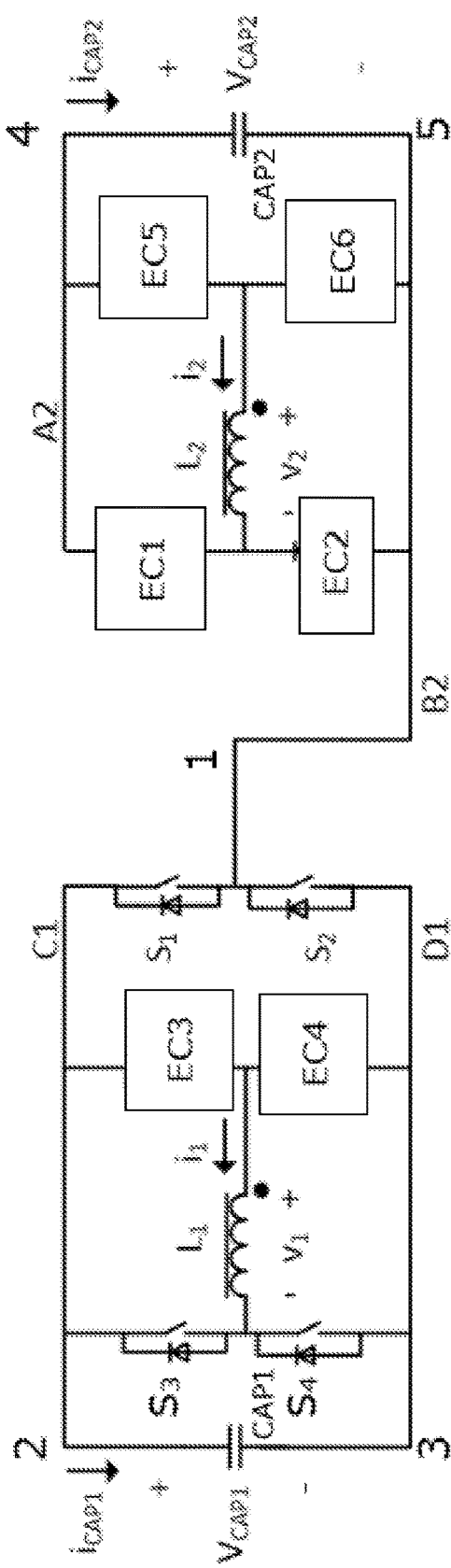
FIGS. 13-17 illustrates schematically 2-level power circuits as provided in the third aspect.
Figure 14:
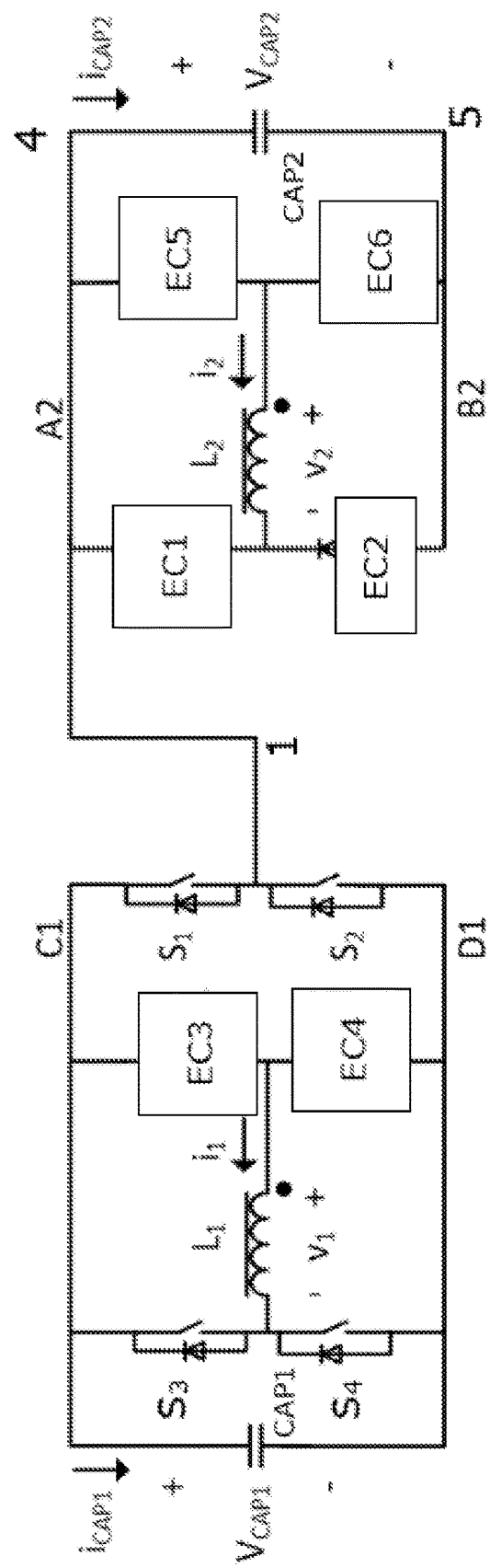

FIGS. 13 and 14 show power circuits, which form the basis for the power circuits according to the third aspect of the present invention. The power circuits are arranged to receive a DC electric input signal at first and second connection terminals C1, D1, and to output an AC or DC electric output signal at a third and a fourth connection terminals A2, B2.

The first connection terminal C1 is connected to a first electrically controllable bidirectional two-quadrant switch $S_1$, the second connection terminal D1 is connected to a second electrically controllable bidirectional two-quadrant switch $S_2$, the third connection terminal A2 is connected to a first electronic component EC1, and the fourth connection terminal B2 is connected to a second electronic component EC2.

The first switch $S_1$ and the second switch $S_2$ are connected to a first node 1 in such a way that the switches $S_1$, $S_2$ are connected between the first node 1 and the respective first and second connection terminals C1, D1.

A third electronic component EC3 is connected to the first connection terminal C1 and a fourth electronic component EC4 is connected to the second connection terminal D1.

A third electrically controllable bidirectional two-quadrant switch $S_3$ is connected to a second node 2, and the second node 2, the third electronic component EC3, the third electrically controllable bidirectional two-quadrant switch $S_3$ and the first connection terminal C1 are connected.

A fourth electrically controllable bidirectional two-quadrant switch $S_4$ is connected to a third node 3, and the third node 3, the fourth electronic component EC4, the fourth electrically controllable bidirectional two-quadrant switch $S_4$ and the second connection terminal D1 are connected.

A first capacitor CAP1 is connected to the second and third node 2, 3.

The third electronic component EC3, the fourth electronic component EC4, the third electrically controllable bidirectional two-quadrant switch $S_3$ and the fourth electrically controllable bidirectional two-quadrant switch $S_4$ are connected to a first coupled inductor L1 in such a way that:
  the third electronic component EC3 is connected between the first coupled inductor L1 and the first connection terminal C1,
  the fourth electronic component EC4 is connected between the first coupled inductor L1 and the second connection terminal D1,
  the third electrically controllable bidirectional two-quadrant switch $S_3$ is connected between the first coupled inductor L1 and the second node 2, and
  the fourth electrically controllable bidirectional two-quadrant switch $S_4$ is connected between the first coupled inductor L1 and the third node 3.

A fifth electronic component EC5 is connected to a fourth node 4, and the fourth node 4, the first and fifth electronic component EC1, EC5 and the third connection terminal A2 are connected.

A sixth electronic component EC6 is connected to a fifth node 5, and the fifth node 5, the second and sixth electronic component EC2, EC6 and the fourth connection terminal B2 are connected.

A second capacitor CAP2 is connected to the fourth and fifth node 4, 5.

The first, second, fifth and sixth electronic component EC1, EC2, EC5, EC6 are connected to a second coupled inductor L2 in such a way that:
  the first electronic component EC1 is connected between the second coupled inductor L2 and the third connection terminal A2,
  the second electronic component EC2 is connected between the second coupled inductor L2 and the fourth connection terminal B2,
  the fifth electronic component EC5 is connected between the second coupled inductor L2 and the fourth node 4, and
  the sixth electronic component EC6 is connected between the second coupled inductor L2 and the fifth node 5.

As electrically controllable switches one may use IGBT, MCT, GTO, SCR, HEMT or MOSFET transistors with diode function enabling bi-directional current flow.

Figure 15:
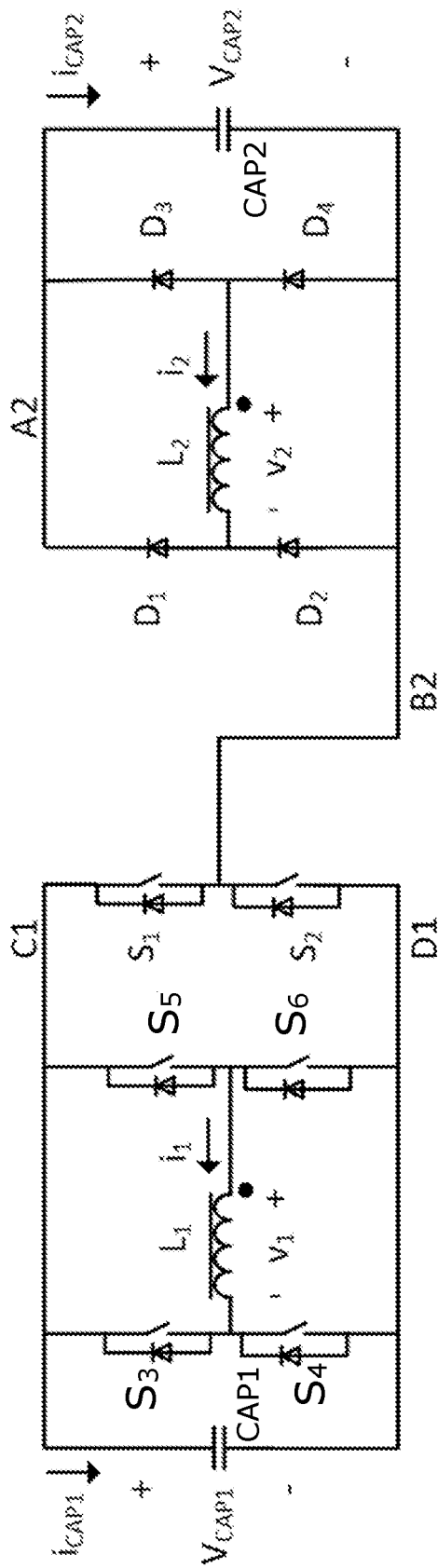

FIG. 15 shows a power circuit according to an embodiment of the third aspect of the present invention, wherein the circuit has the same components and connections as the circuit shown in FIG. 13 and wherein the first, second, fifth and sixth electronic component EC1, EC2, EC5, EC6 are diodes $D_1$, $D_2$, $D_3$, $D_4$, the third and fourth electronic components EC3, EC4 are electrically controllable switches $S_5$, $S_6$ and the first node 1 is connected to the fourth connection terminal B2.

As electrically controllable switches one could use IGBT, MCT, GTO, SCR, HEMT or MOSFET transistors with diode function enabling bi-directional current flow.

Not shown in FIG. 15 is the option of replacing either the diodes placed as the first and second electronic component EC1, EC2 with capacitors, or replacing the diodes placed as the fifth and sixth electronic component EC1, EC2 with capacitors.

Figure 16:
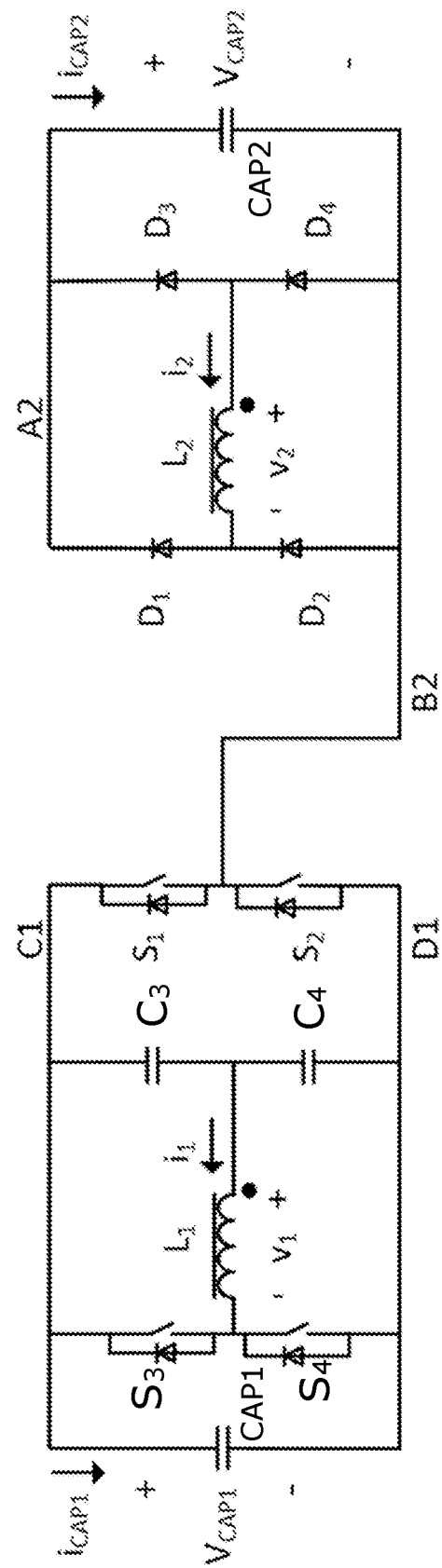

FIG. 16 shows a power circuit according to an embodiment of the third aspect of the present invention, wherein the circuit has the same components and connections as the circuit shown in FIG. 13 and wherein the first, second, fifth and sixth electronic component EC1, EC2, EC5, EC6 are diodes $D_1$, $D_2$, $D_3$, $D_4$, the third and fourth electronic components EC3, EC4 are capacitors $C_3$, $C_4$ and the first node 1 is connected to the fourth connection terminal B2.

P-type version of the general three level circuit will produce only zero or positive voltages. The B2 voltage is a synthesized pulsed voltage comprised by an AC voltage and a non-zero DC voltage component.

Not shown in FIG. 16 is the option of replacing either the diodes placed as the first and second electronic component EC1, EC2 with capacitors, or replacing the diodes placed as the fifth and sixth electronic component EC1, EC2 with capacitors.

Figure 17:
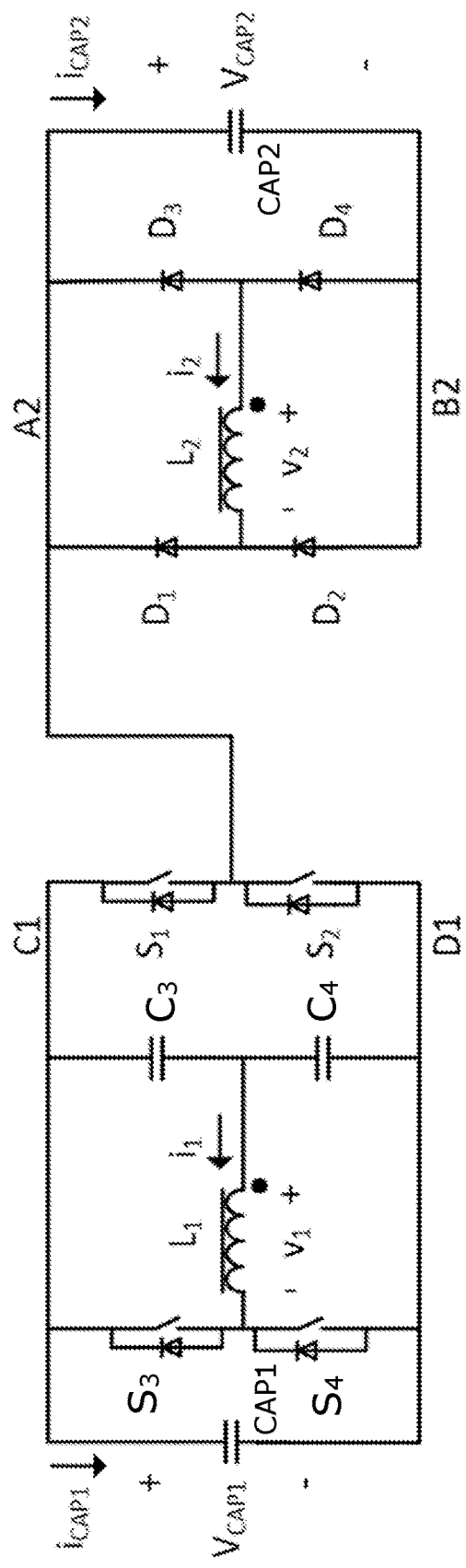

FIG. 17 shows a power circuit according to an embodiment of the third aspect of the present invention, wherein the circuit has the same components and connections as the circuit shown in FIG. 13 and wherein the first, second, fifth and sixth electronic component EC1, EC2, EC5, EC6 are diodes $D_1$, $D_2$, $D_3$, $D_4$, the third and fourth electronic components EC3, EC4 are capacitors $C_3$, $C_4$ and the first node 1 is connected to the third connection terminal A2.

N-type version of the general three level circuit will produce only zero or negative voltages. The B2 voltage is a synthesized pulsed voltage comprised by an AC voltage and a non-zero DC voltage component.

Not shown in FIG. 17 is the option of replacing either the diodes placed as the first and second electronic component EC1, EC2 with capacitors, or replacing the diodes placed as the fifth and sixth electronic component EC1, EC2 with capacitors.

Each of the power circuits shown in FIGS. 1-17 could be implemented in one single package configuration or comprised of discrete transistors with diode function.

Figure 18:
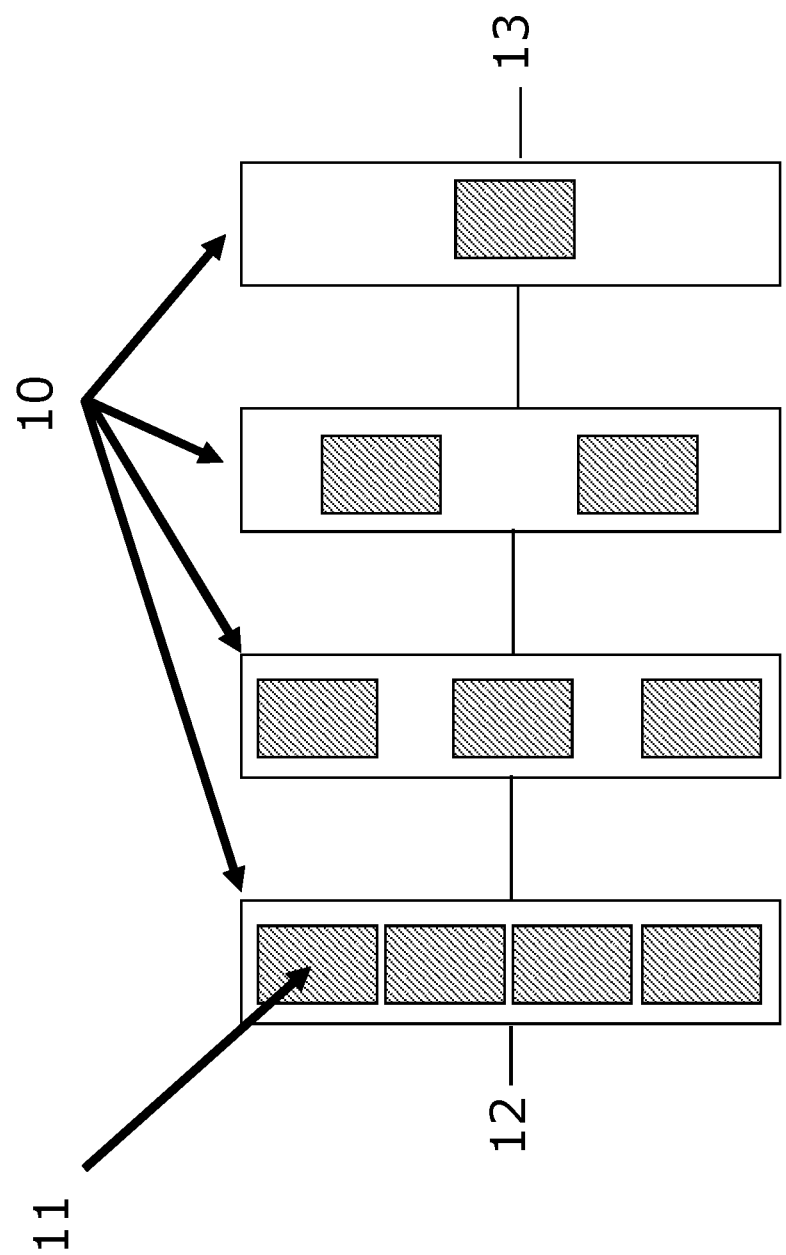
FIG. 18 illustrates schematically a power converter.

FIG. 18 shows a power converter comprised of power converter circuits 10, which again are comprised of power circuits 11. In the illustration in FIG. 18 the power converter circuits have one to four power circuits, but a power converter circuit 10 could also comprise more than four power circuits. The power circuits 11 are power circuits as described herein. If there are two or more power circuits 11 in a power converter circuit 10, they are connected in parallel.

In the illustration in FIG. 18 the power converter is comprised of 4 power converter circuits, but a power converter could have one or more. If the power converter is comprised of two or more power converter circuits 10, then the power converter circuits are connected in series.

The power converter may receive a DC electric input signal at an input connection 12 and output either an AC or a DC electric output signal at an output connection 13. At the input connection 12 the electric signal may be a low voltage, high current signal, which is then converted to a high voltage, low current signal to be output at the output connection 13 or vice versa, i.e. a high voltage, low current signal is converted to a low voltage, high current signal.

The setup wherein the power converter comprises converter submodules (the power converter circuits herein) the system is highly scalable allowing for a wide variety of configurations. The power converter circuits 10 may be configured such that each power converter circuit experiences approximately the same power, when the power converter is in use.

Figure 19:
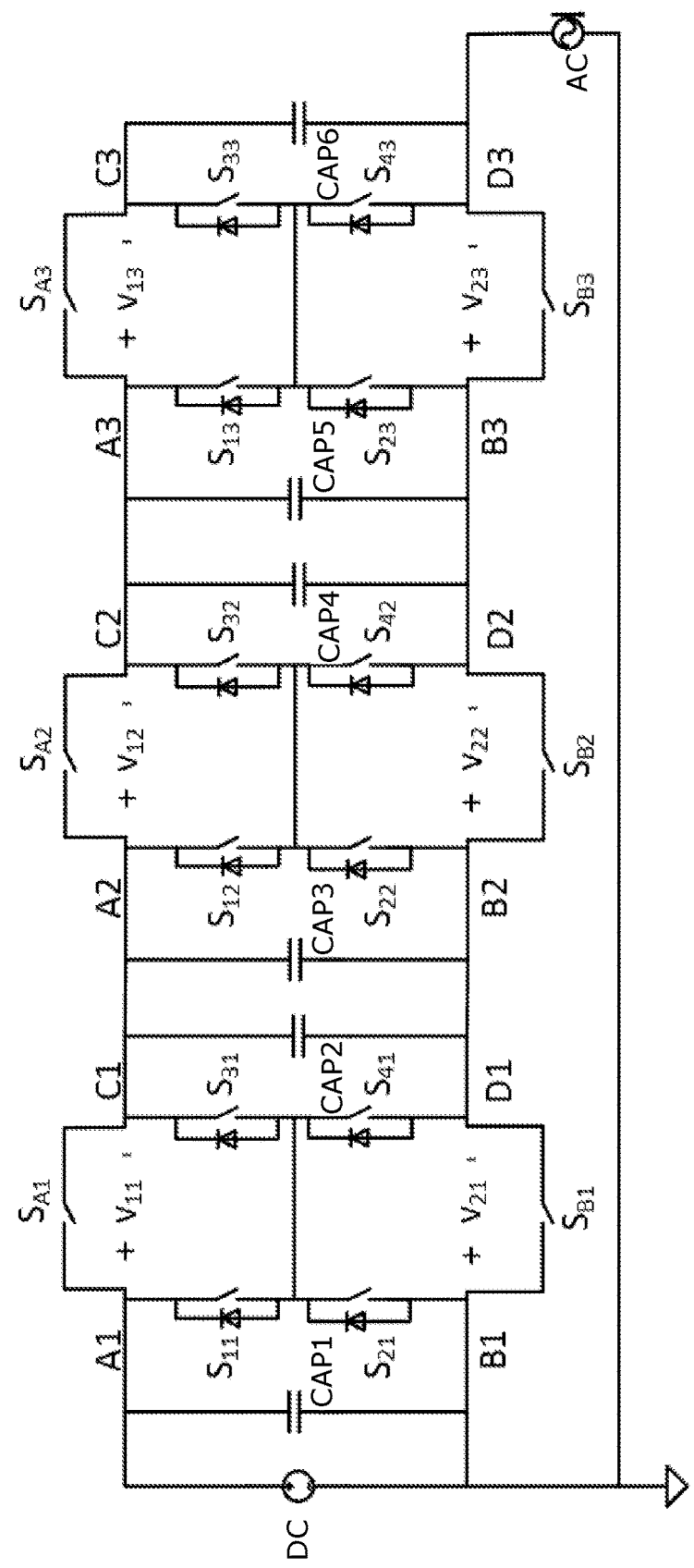
FIG. 19 illustrates schematically a power converter comprising three power converter circuits connected in series.

In FIG. 19 is shown schematically a power converter comprising three power converter circuits connected in series. In the illustration each power converter circuit comprises a single power circuit as the one shown in FIG. 6.

In FIG. 20 is shown schematically power converter circuits connected in series with a half bridge circuit. By finishing the series connected circuitry off with a half bridge circuit, also known as a half-H cell, the energy loss in the power converter is reduced and an extra voltage level is added to the power converter.

The power converters illustrated schematically in FIGS. 18-20 may be arranged to receive a DC input voltage of 1 V-1.5 kV, such as 1000 V and may be arranged to output an AC voltage of 100 V-100 kV, such as 690 V or 33 kV or 66 kV. They may also be arranged to convert electric power of 1-100 W, 100 W-1 kW, 1 kW-100 kW, 100 kW-1 MW, 1 MW-10 MW or above 10 MW.

In FIG. 21 is shown schematically a device 20 comprising a power converter 21 as disclosed herein. The device may further comprise a DC power electric generator 22.

FIG. 22 shows schematically a modular multi-level converter (MMC) 23 comprising a power converter 21 as disclosed herein and further comprising a control circuit 24 to control the switches. Even though the power converter may comprise a large number of switches the control of the switches will generally be simple as many of the switches cannot be ON, i.e. closed, at the same time. The modular multi-level converter (MMC) may operate at a fundamental frequency within the range from 1 Hz to 20 MHz.

FIG. 23 illustrates schematically the method, wherein a modular multi-level converter (MMC) as disclosed herein is provided 25 and controlling 26 the electrically controllable switches such that output voltage states generate an alternating voltage causing a current of controllable amplitude and frequency controlling the load connected to the MMC.

Figure 24A:
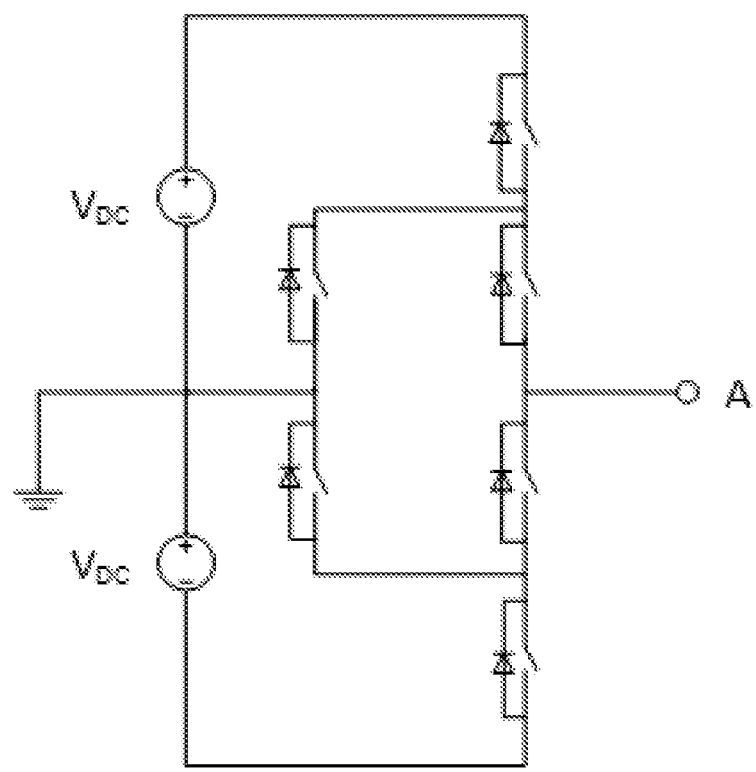
FIG. 24A illustrates schematically a prior art solution.

In FIG. 24A is shown schematically a costly prior art solution in most applications, alternatively using only one DC source and two DC capacitors. The solution introduces voltage balancing challenges and can include implementation of additional complex control causing power losses or simpler control requiring bulky capacitors.

Figure 24B:
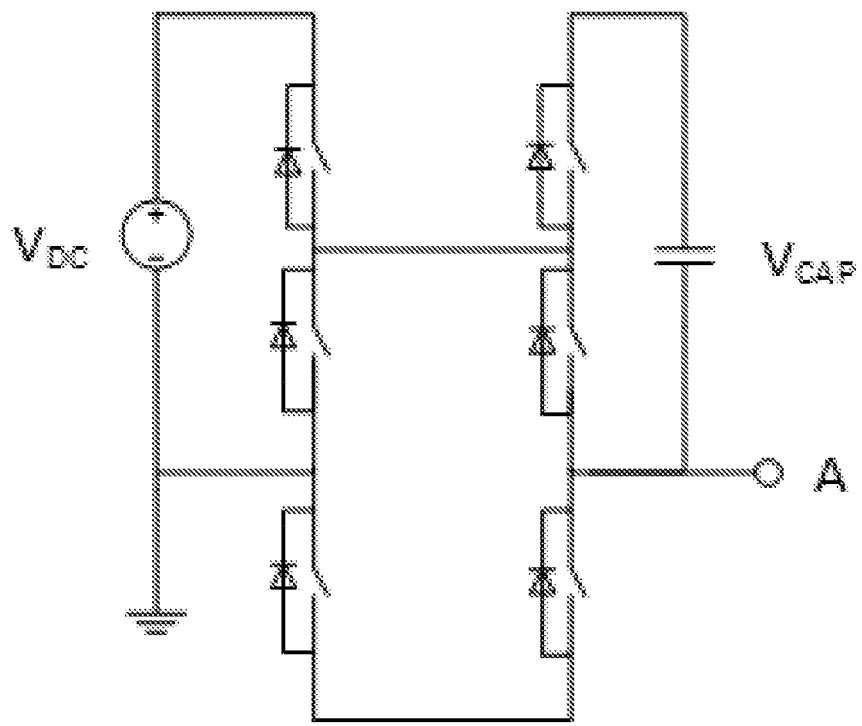
FIG. 24B illustrates schematically a simpler solution to the prior art shown in FIG. 24A.

In FIG. 24B is shown schematically a simpler control using a conventional control strategy. An advantage, when compared with circuit shown in FIG. 24A, is that the voltage balancing problem is eliminated as the present invention offers a switching state, where the flying capacitor is now in parallel with the DC source and in this state the capacitor voltage is equalised to the DC source.

Power converters have many applications with converters designed for different voltage levels: (i) low voltage 0V-1000V, (ii) medium voltage 1000V-35000V, and (iii) in high voltage systems the voltage can reach hundred thousands of volts. A key building element of the Power converters are the semiconductors and the desired ability to (i) block the voltage and at almost zero current or (ii) conduct the current at almost zero voltage. The blocking voltage of existing semiconductors are limited to a few thousand volts and in applications for medium and high voltage systems, the voltage rating of one single semiconductor can be too low to block the voltage.

To use existing blocking voltage rated semiconductors in medium and high voltage system two methods can be used:
1) A transformer serves to increase the voltage from the power converter from e.g. 1000V up to 33000V, in this way lower blocking voltage semiconductors can be used. Alternatively: 2) Modular Converter solutions, where converter cells are designed for a lower voltage e.g. 1000V and then the cells are connected in a serial string to obtain e.g. 33000V and this is a modular converter.

One challenge of the modular converter is balance of the cell energy received and transmitted. The energy received must be equal to energy transmitted and energy lost during the power conversion process, this is a necessary condition to sustain the cells ability to control the power.

Figure 25A:
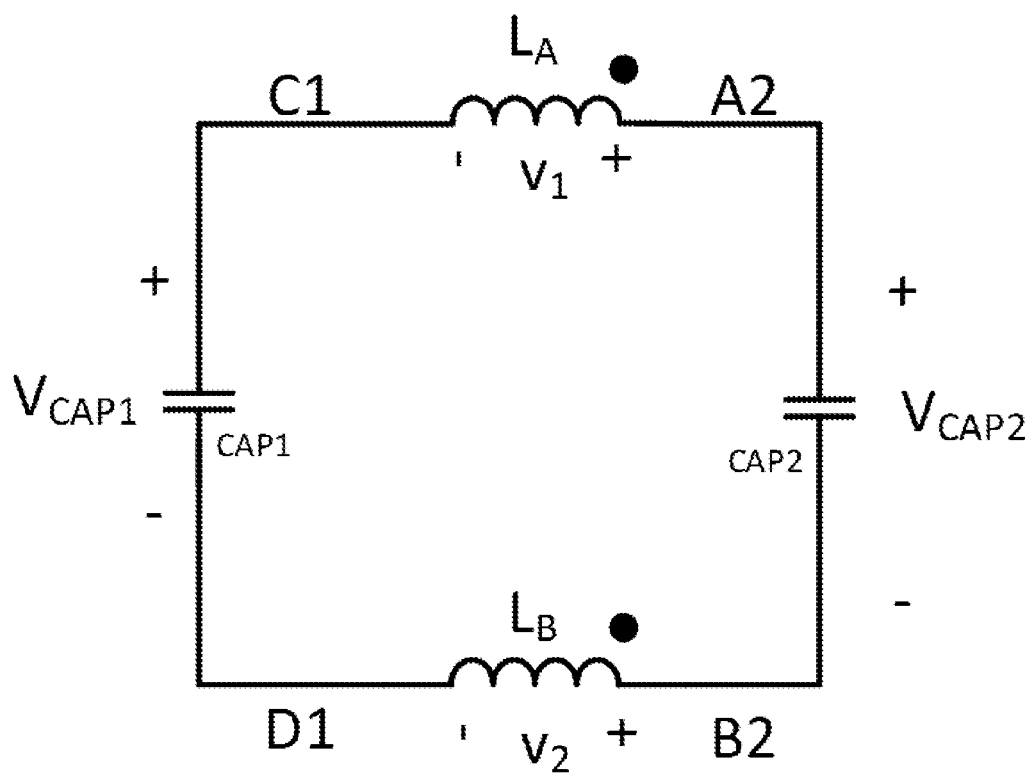
FIGS. 25-28 illustrate yet further power converter circuit embodiments.
Figure 25B:
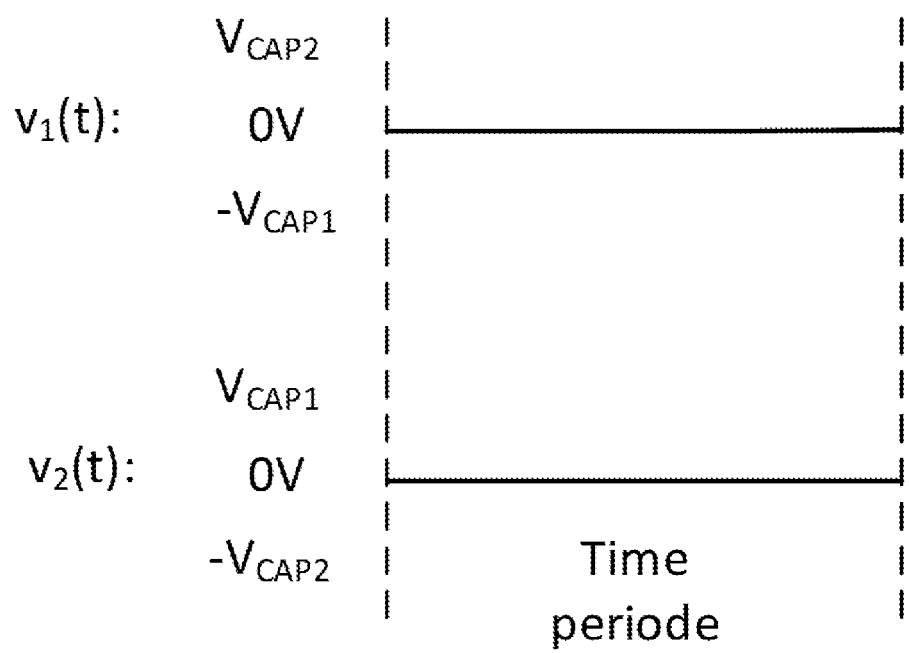

FIGS. 25a and 25b shows an example of how to connect two energy-storage elements: the capacitors CAP1 and CAP2. If the voltage of capacitors becomes non-equal the inductors $L_A$ and $L_B$ conduct current until the capacitor voltages becomes equal. When $V_{CAP1}=V_{CAP2}$ the voltages $v_1$ and $v_2$ are both zero, as shown FIGS. 25a and 25b. Inductors $L_A$ and $L_B$ may be magnetically coupled as shown by the inductor dots. In FIGS. 25a and 25b, the voltage of the inductors are zero during the shown time period. A non-zero voltage is also possible, but with a constraint: A voltage applied across inductors $L_A$ and $L_B$ for a time period will cause a current build up. The current level can be brought back to initial current values applying a negative voltage across inductors $L_A$ and $L_B$ applied a time period with a duration length so the time-integral of positive and negative voltage becomes zero.

Figure 26A:
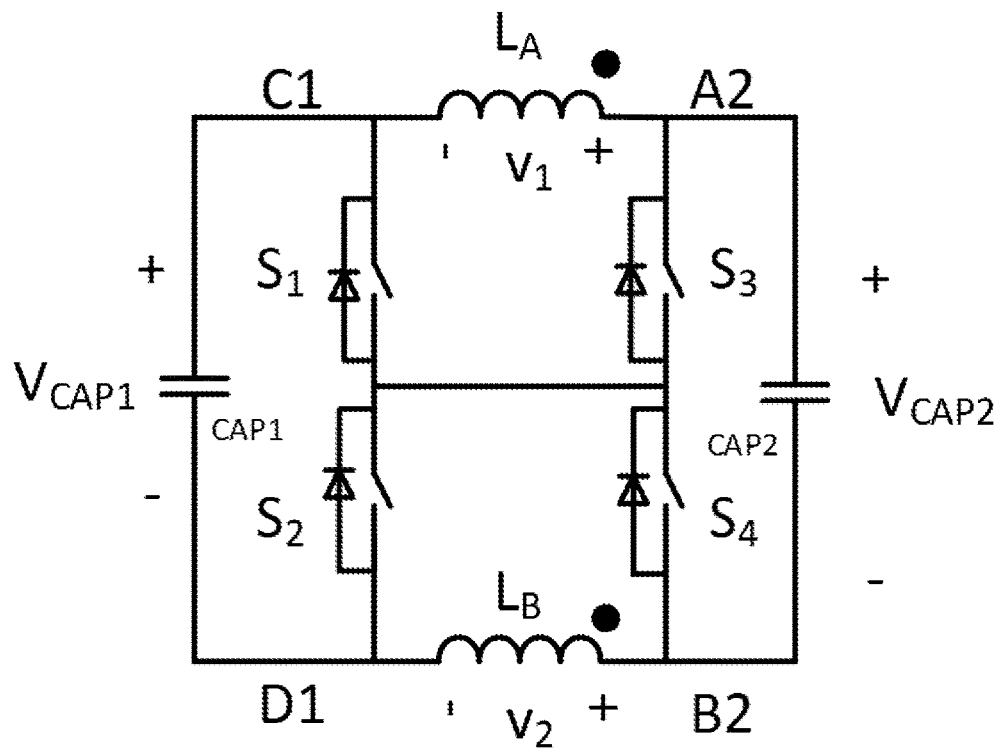
Figure 26B:
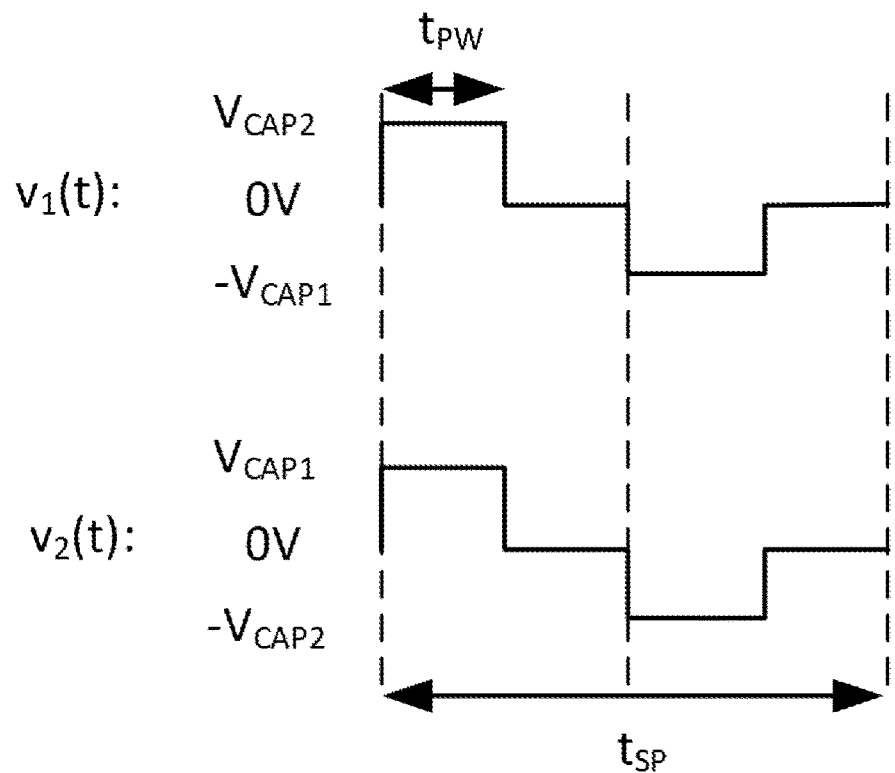

FIGS. 26a and 26b show a solution to this constraint, namely the use of pulse voltages, and in practice this means the average voltage of $v_1$ and $v_2$ must be zero over time period tsp. Therefore, only AC signals can be generated and DC is not possible. If DC is applied the current of $L_A$ and $L_B$ will eventually approach infinity. However, if the average voltage per time interval becomes zero, the current of $L_A$ and $L_B$ can be limited to acceptable values by decreasing the length of the time interval or use larger values of $L_A$ and $L_B$ inductance.

The benefit of this approach is:
1) Equalization of voltages $V_{CAP1}$ and $V_{CAP2}$ is done by inductors $L_A$ and $L_B$, i.e. a passive method.
2) The PN cell only need four switches $S_1$, $S_2$, $S_3$ and $S_4$ for generation of pulse voltages.
3) The inductors will act to equalize the $V_{CAP1}$ and $V_{CAP2}$ with magnetic coupling of $L_A$ and $L_B$.
4) The inductors will act to equalize the $V_{CAP1}$ and $V_{CAP2}$ with-out magnetic coupling of $L_A$ and $L_B$ also
5) The cell is easily controlled by $S_1$, $S_2$, $S_3$ and $S_4$ to generate a PWM sinus sinusoidal current.
6) The cell switches $S_1$, $S_2$, $S_3$ and $S_4$ can be soft-switched, thus reducing switching loss and making the cell useful for kHz and MHz frequency operation.

The limitations can be seen as the size of $L_A$ and $L_B$ increases with longer period time intervals and at low frequencies, e.g. 50 Hz, the magnetics becomes bulky and heavy. Further, a DC voltage component in $v_1$ and $v_2$ can cause unwanted current flow.

Figure 27:
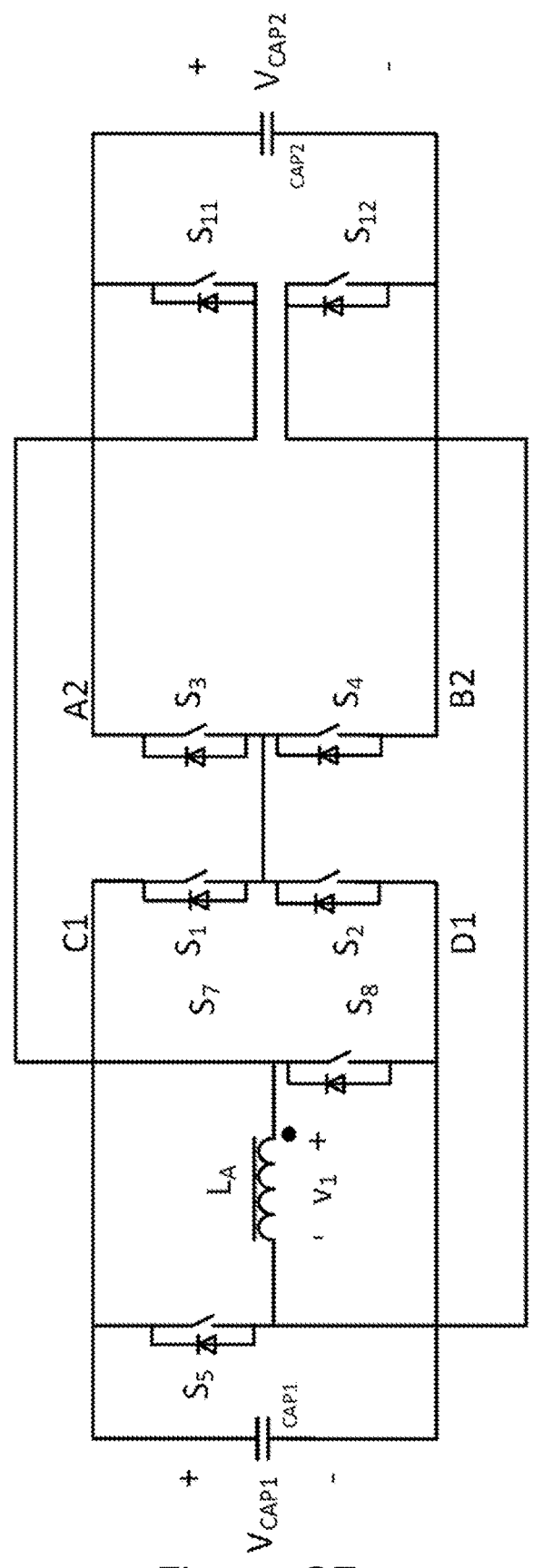

FIG. 27 shows an example of a circuit that overcomes the limitation of unwanted current flow at DC. This circuit differ from the previous circuits by the use of a transformer, thus now only one inductor $L_A$ is used. The benefit of the approach compared to the circuit in FIGS. 25a and 25b is, that 1) a DC voltage can be produced at V(B2,D1) and V(A2,C1), 2) the PN cell uses S1, S2, S3 and S4 for generation of pulse voltages, 3) switches S5, S8, S11 and S12 with $L_A$ equalize the voltage of $V_{CAP1}$ and $V_{CAP2}$. The limitations can be seen as the fact that the switches S5, S8, S11 and S12 in operation will provide a pulsating current in CAP1 and CAP2, a more smooth current will give less current stress, and furthermore voltage rating of S5, S8, S11 and S12 are the sum of voltages $V_{CAP1}$ and $V_{CAP2}$.

Figure 28:
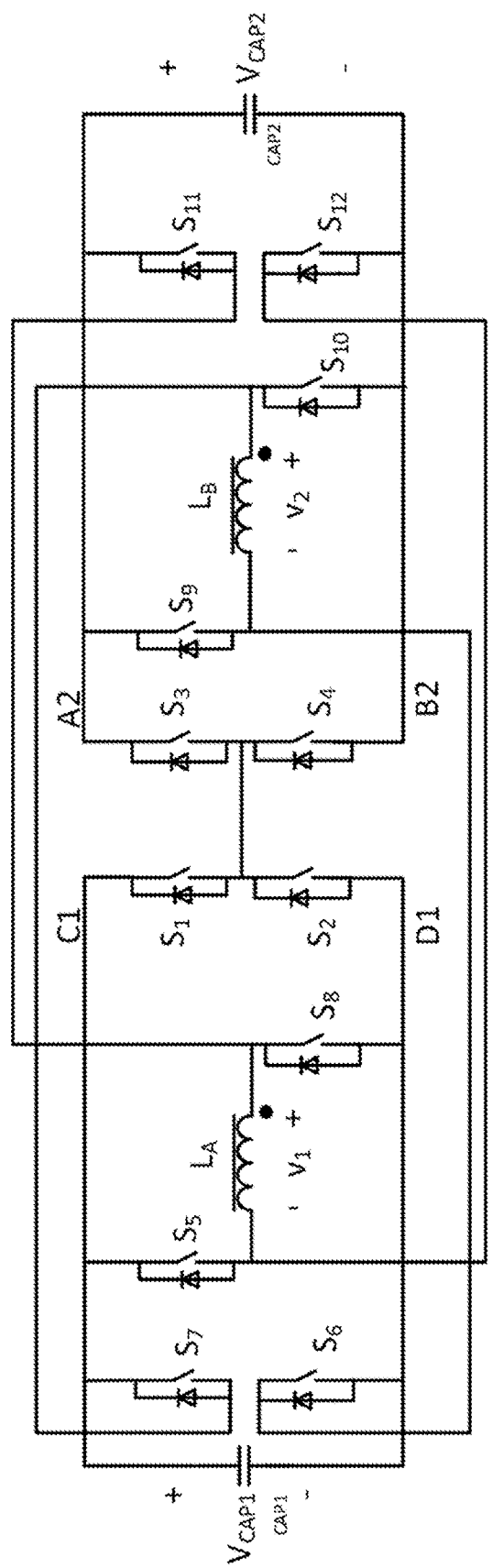

FIG. 28 shows a converter circuit which eliminates the limitation of pulsating current mentioned above for the circuit of FIG. 27. The benefit of the approach shown in FIG. 28 compared to that of FIG. 28 is that the energy balancing of CAP1 and CAP2 is continuous, or almost continuous, and that the voltage of $V_{CAP1}$ and $V_{CAP2}$ can be equalized more tightly with a magnetic coupling as indicated by the dots on $L_A$ and $L_B$.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

A, B, C, D Connection terminals
A1, A2, A3 Connection terminals
B1, B2, B3 Connection terminals
C1, C2, C3 Connection terminals
D1, D2, D3 Connection terminals
CAP1, CAP2, CAP3, . . . Capacitors
$C_1, C_2, \ldots$ Capacitors
s1, s2, s3, s4, . . . Switches
sa, sb Switches
$S_1, S_2, S_3, \ldots$ Switches
1, 2, 3, 4, 5 First, second, third, fourth and fifth node
EC1, EC2, EC3, EC4, . . . Electronic components
L1, L2 Coupled inductors
$D_1, D_2, D_3, \ldots$ Diodes
10 Power converter circuits
11 Power circuits
12 Input connection
13 Output connection
20 Device
21 Power converter
22 DC power electric generator
23 Modular multi-level converter (MMC)
24 Control circuit
25 MMC is provided
26 Control

The invention claimed is:

1. A power circuit arranged to receive a DC electric input signal at a first connection terminal and a second connection terminal, and to output an AC electric output signal at a third connection terminal and a fourth connection terminal, the power circuit comprising:
   the first connection terminal being connected to a first electrically controllable bidirectional two-quadrant switch;
   the second connection terminal being connected to a second electrically controllable bidirectional two-quadrant switch;
   the third connection terminal being connected to a third electrically controllable bidirectional two-quadrant switch;
   the fourth connection terminal being connected to a fourth electrically controllable bidirectional two-quadrant switch,
   the first, second, third and fourth electrically controllable bidirectional two-quadrant switches being connected to a first node such that the first, second, third and fourth electrically controllable bidirectional two-quadrant switches are connected between the first node and the respective first, second, third, and fourth connection terminals,
   wherein the first node is directly connected between the first and second electrically controllable bidirectional two-quadrant switches and directly connected between the third and fourth electrically controllable bidirectional two-quadrant switches;
   a first inductor directly connected between the first connection terminal and the third connection terminal;
   a second inductor directly connected between the second connection terminal and the fourth connection terminal;
   a first capacitor directly connected between the first connection terminal and the second connection terminal; and
   a second capacitor directly connected between the third connection terminal and the fourth connection terminal,
   wherein one of the first connection terminal and the second connection terminal is connected to one of the third connection terminal and the fourth connection terminal through at least two of the first, second, third and fourth electrically controllable bidirectional two-quadrant switches, and
   wherein the first inductor and the second inductor are magnetically coupled with each other and operate to equalize a voltage of the first capacitor with a voltage of the second capacitor.

2. The power circuit of claim 1, wherein at least one of the first, second, third and fourth electrically controllable bidirectional two-quadrant switches comprise IGBT or MOSFET transistors with diode function enabling bi-directional current flow.

3. A power converter circuit, the power converter circuit comprising the power circuit of claim 1.

4. A power converter, the power converter comprising two or more power converter circuits of the power converter circuit of claim 3, wherein the two or more power converter circuits are connected in series.

5. The power converter of claim 4, wherein the two or more power converter circuits are configured such that each power converter circuit has approximately the same power when the power converter is in use.

6. The power converter of claim 4, wherein the two or more power converter circuits are connected in series.

7. The power converter of claim 4, wherein the power converter is arranged to receive a DC input voltage of 1 V-1.5 kV.

8. The power converter of claim 4, wherein the power converter is arranged to output an AC voltage of 100 V-100 kV.

9. The power converter of claim 4, wherein the power converter is arranged to convert electric power of 1-100 W.

10. The power converter of claim 4, wherein the power converter is arranged to convert electric power of 100 W-1 kW.

11. The power converter of claim 4, wherein the power converter is arranged to convert electric power of 1 kW-100 kW.

12. The power converter of claim 4, wherein the power converter is arranged to convert electric power of 100 kW-1 MW.

13. The power converter of claim 4, wherein the power converter is arranged to convert electric power of 1 MW-10 MW.

14. The power converter of claim 4, wherein the power converter is arranged to convert electric power above 10 MW.

15. A modular multi-level converter comprising the power converter of claim 4 and further comprising a control circuit to control the first, second, third and fourth electrically controllable bidirectional two-quadrant switches.

16. A power converter circuit, the power converter circuit comprising two or more power circuits of the power circuit of claim 1, wherein the two or more power circuits are connected in parallel.

* * * * *